US008924461B2

(12) United States Patent
Gentile et al.

(10) Patent No.: US 8,924,461 B2
(45) Date of Patent: Dec. 30, 2014

(54) METHOD, SYSTEM, AND COMPUTER READABLE MEDIUM FOR REMOTE ASSISTANCE, SUPPORT, AND TROUBLESHOOTING

(75) Inventors: Mark Gentile, Rochester, NY (US); Jim Sullivan, Pittsford, NY (US); Mark Hanson, Rochester, NY (US); Mark Wade, Bellingham, WA (US)

(73) Assignee: Symantec Corporation, Mountain View, CA (US)

( * ) Notice: Subject to any disclaimer, the term of this patent is extended or adjusted under 35 U.S.C. 154(b) by 353 days.

(21) Appl. No.: 13/020,424

(22) Filed: Feb. 3, 2011

(65) Prior Publication Data

US 2011/0213821 A1    Sep. 1, 2011

Related U.S. Application Data

(60) Provisional application No. 61/301,124, filed on Feb. 3, 2010.

(51) Int. Cl.
| | | |
|---|---|---|
| G06F 15/16 | (2006.01) | |
| H04L 29/08 | (2006.01) | |
| H04L 12/26 | (2006.01) | |
| H04L 12/24 | (2006.01) | |
| H04L 29/06 | (2006.01) | |

(52) U.S. Cl.
CPC ........... *H04L 43/065* (2013.01); *H04L 41/0273* (2013.01); *H04L 67/06* (2013.01); *H04L 67/22* (2013.01); *H04L 67/025* (2013.01); *H04L 63/0428* (2013.01); *H04L 63/168* (2013.01)
USPC ........... 709/202; 709/201; 709/203; 709/217; 709/218; 709/219

(58) Field of Classification Search
CPC ..... H04L 43/065; H04L 67/025; H04L 67/06; H04L 67/22; H04L 41/0273; H04L 63/0428; H04L 63/168
See application file for complete search history.

(56) References Cited

U.S. PATENT DOCUMENTS

| | | | |
|---|---|---|---|
| 4,306,329 | A | 12/1981 | Yokoi |
| 4,614,943 | A | 9/1986 | Boucher |
| 4,949,248 | A | 8/1990 | Caro |
| 5,128,667 | A | 7/1992 | Enomoto |

(Continued)

FOREIGN PATENT DOCUMENTS

| | | |
|---|---|---|
| WO | WO2005069672 A1 | 7/2005 |
| WO | WO2009056148 A2 | 5/2009 |

*Primary Examiner* — Nicholas Taylor
*Assistant Examiner* — Padma Mundur
(74) *Attorney, Agent, or Firm* — Holland & Hart LLP

(57) ABSTRACT

The present disclosure enables remote device management. A programmatic interface is associated with each application plug-in A web server included with the on-device agent provides access to the programmatic interfaces according to open standards such as HTML or XML. The present disclosure enables access to remote devices through existing infrastructure without the need for proprietary systems. An IT administrator or other administrator may remotely access and update software and hardware, track device data plan usage statistics, provide live support, and track current and historical device locations. Through the support features of the present disclosure an IT administrator or other support operator may remotely operate a device as if they were actually holding the device. This feature provides direct access to device files and software while also showing the IT administrator screen views of the remote device. Thus, the IT administrator actually sees what the remote user also sees.

18 Claims, 23 Drawing Sheets

(56) References Cited

U.S. PATENT DOCUMENTS

| | | | |
|---|---|---|---|
| 5,774,063 A | 6/1998 | Berry | |
| 5,870,686 A | 2/1999 | Monson | |
| 5,889,942 A | 3/1999 | Orenshteyn | |
| 6,011,372 A | 1/2000 | Popovich | |
| 6,195,678 B1 | 2/2001 | Komuro | |
| 6,275,693 B1 | 8/2001 | Lin | |
| 6,321,991 B1 | 11/2001 | Knowles | |
| 6,339,706 B1 | 1/2002 | Tillgren | |
| 6,393,569 B1 | 5/2002 | Orenshteyn | |
| 6,447,362 B2 | 9/2002 | Khamphilavong | |
| 6,560,469 B1 | 5/2003 | Kim | |
| 6,812,476 B1 | 11/2004 | Alexandre | |
| 6,868,070 B1 | 3/2005 | Alves | |
| 6,998,966 B2 | 2/2006 | Pedersen | |
| 7,065,783 B2 | 6/2006 | Rygaard | |
| 7,086,051 B2 | 8/2006 | Gautney | |
| 7,099,663 B2 | 8/2006 | Lundblade | |
| 7,123,933 B2 | 10/2006 | Poor | |
| 7,191,281 B2 | 3/2007 | Bajikar | |
| 7,194,259 B2 | 3/2007 | DeLine | |
| 7,206,548 B1 | 4/2007 | Sumler | |
| 7,293,078 B2 | 11/2007 | Danforth | |
| 7,330,717 B2 | 2/2008 | Gidron | |
| 7,353,512 B2 | 4/2008 | Katz | |
| 7,359,933 B1 | 4/2008 | Polen | |
| 7,395,126 B2 | 7/2008 | Decker | |
| 7,512,651 B2 | 3/2009 | Offermann | |
| 7,548,197 B2 | 6/2009 | Gruchala | |
| 7,548,746 B2 | 6/2009 | Kalke | |
| 7,565,141 B2 | 7/2009 | Macaluso | |
| 7,577,879 B2 | 8/2009 | Lantz | |
| 7,584,241 B2 | 9/2009 | Kureshy | |
| 7,605,752 B2 | 10/2009 | Angus | |
| 7,606,562 B2 | 10/2009 | Aaltonen | |
| 7,730,111 B2 | 6/2010 | DeAnna | |
| 7,750,811 B2 | 7/2010 | Puzio | |
| 7,865,182 B2 | 1/2011 | Macaluso | |
| 7,899,449 B2 | 3/2011 | Knowles | |
| 7,966,387 B1 | 6/2011 | Katzer | |
| 8,000,700 B2 | 8/2011 | Choi | |
| 8,005,913 B1 | 8/2011 | Carlander | |
| 8,010,842 B2 | 8/2011 | Krivopaltsev | |
| 8,051,149 B2 | 11/2011 | Hodgson | |
| 8,055,237 B2 | 11/2011 | Jones | |
| 8,060,074 B2 | 11/2011 | Danford | |
| 2001/0040892 A1 | 11/2001 | Spencer | |
| 2001/0055931 A1 | 12/2001 | Khamphilavong | |
| 2002/0023233 A1 | 2/2002 | O'Meany | |
| 2002/0078240 A1 | 6/2002 | Ehrlich | |
| 2002/0087628 A1 | 7/2002 | Rouse | |
| 2002/0156777 A1 | 10/2002 | Raju | |
| 2002/0161874 A1 | 10/2002 | McGuire | |
| 2002/0186203 A1 | 12/2002 | Huang | |
| 2003/0003943 A1 | 1/2003 | Bajikar | |
| 2003/0009675 A1 | 1/2003 | Rygaard | |
| 2003/0016417 A1 | 1/2003 | Lee | |
| 2003/0022657 A1 | 1/2003 | Herschberg | |
| 2003/0055877 A1 | 3/2003 | Williams | |
| 2003/0055909 A1 | 3/2003 | Hartwig | |
| 2003/0060188 A1 | 3/2003 | Gidron | |
| 2003/0084165 A1 | 5/2003 | Kjellberg | |
| 2003/0117499 A1 | 6/2003 | Bianchi | |
| 2003/0140343 A1 | 7/2003 | Falvo | |
| 2003/0160873 A1 | 8/2003 | Tecu | |
| 2003/0182431 A1* | 9/2003 | Sturniolo et al. | 709/227 |
| 2003/0204599 A1 | 10/2003 | Trossen | |
| 2004/0002943 A1 | 1/2004 | Merrill | |
| 2004/0040022 A1 | 2/2004 | Gautney | |
| 2004/0162876 A1 | 8/2004 | Kohavi | |
| 2004/0171346 A1 | 9/2004 | Lin | |
| 2004/0171370 A1 | 9/2004 | Natarajan | |
| 2004/0203590 A1 | 10/2004 | Shteyn | |
| 2004/0246382 A1 | 12/2004 | Liu | |
| 2005/0027794 A1 | 2/2005 | Decker | |
| 2005/0038880 A1 | 2/2005 | Danforth | |
| 2005/0064860 A1 | 3/2005 | DeLine | |
| 2005/0070259 A1 | 3/2005 | Kloba | |
| 2005/0071448 A1 | 3/2005 | Katz | |
| 2005/0110752 A1 | 5/2005 | Pedersen | |
| 2005/0148359 A1 | 7/2005 | Joeressen | |
| 2005/0149564 A1* | 7/2005 | Jain et al. | 707/104.1 |
| 2005/0151727 A1 | 7/2005 | Kwong | |
| 2005/0197113 A1 | 9/2005 | Lin | |
| 2005/0259618 A1* | 11/2005 | Ahya et al. | 370/331 |
| 2006/0002344 A1 | 1/2006 | Ono | |
| 2006/0041657 A1 | 2/2006 | Wen | |
| 2006/0080659 A1 | 4/2006 | Ganji | |
| 2006/0095510 A1 | 5/2006 | Rouse | |
| 2006/0116667 A1 | 6/2006 | Hamel | |
| 2006/0143264 A1 | 6/2006 | Payne | |
| 2006/0217104 A1 | 9/2006 | Cho | |
| 2006/0234730 A1 | 10/2006 | Bibr | |
| 2006/0236325 A1* | 10/2006 | Rao et al. | 719/315 |
| 2006/0267936 A1 | 11/2006 | Hoerl | |
| 2006/0281491 A1 | 12/2006 | Shih | |
| 2006/0285514 A1 | 12/2006 | Hoerl | |
| 2007/0026851 A1 | 2/2007 | Hawkins | |
| 2007/0032252 A1 | 2/2007 | Yang | |
| 2007/0049241 A1 | 3/2007 | Shih | |
| 2007/0064113 A1 | 3/2007 | Lee | |
| 2007/0066894 A1 | 3/2007 | Bartol | |
| 2007/0079008 A1 | 4/2007 | Leibovich | |
| 2007/0182545 A1 | 8/2007 | Baum | |
| 2007/0220449 A1 | 9/2007 | Lee | |
| 2007/0232268 A1 | 10/2007 | Park | |
| 2007/0288471 A1 | 12/2007 | Neil | |
| 2007/0288590 A1 | 12/2007 | Hall | |
| 2007/0293194 A1 | 12/2007 | Bisht | |
| 2008/0046883 A1 | 2/2008 | Gautney | |
| 2008/0051076 A1 | 2/2008 | O'Shaughnessy | |
| 2008/0052138 A1 | 2/2008 | Marsh | |
| 2008/0052383 A1 | 2/2008 | O'Shaughnessy | |
| 2008/0090551 A1 | 4/2008 | Gidron | |
| 2008/0134165 A1 | 6/2008 | Anderson | |
| 2008/0139195 A1* | 6/2008 | Marsyla et al. | 455/423 |
| 2008/0195691 A1 | 8/2008 | Kloba | |
| 2008/0207128 A1 | 8/2008 | Mikko | |
| 2008/0248834 A1 | 10/2008 | Chatterjee | |
| 2008/0300005 A1 | 12/2008 | Phool | |
| 2009/0039805 A1 | 2/2009 | Tang | |
| 2009/0075633 A1 | 3/2009 | Lee | |
| 2009/0092397 A1 | 4/2009 | Taguchi | |
| 2009/0100448 A1 | 4/2009 | Baker | |
| 2009/0150476 A1 | 6/2009 | Vrielink | |
| 2009/0150545 A1 | 6/2009 | Flores | |
| 2009/0182802 A1 | 7/2009 | Tran | |
| 2009/0203364 A1 | 8/2009 | Perpinya | |
| 2009/0253424 A1 | 10/2009 | Owen | |
| 2010/0056141 A1* | 3/2010 | Marsan et al. | 455/434 |

* cited by examiner

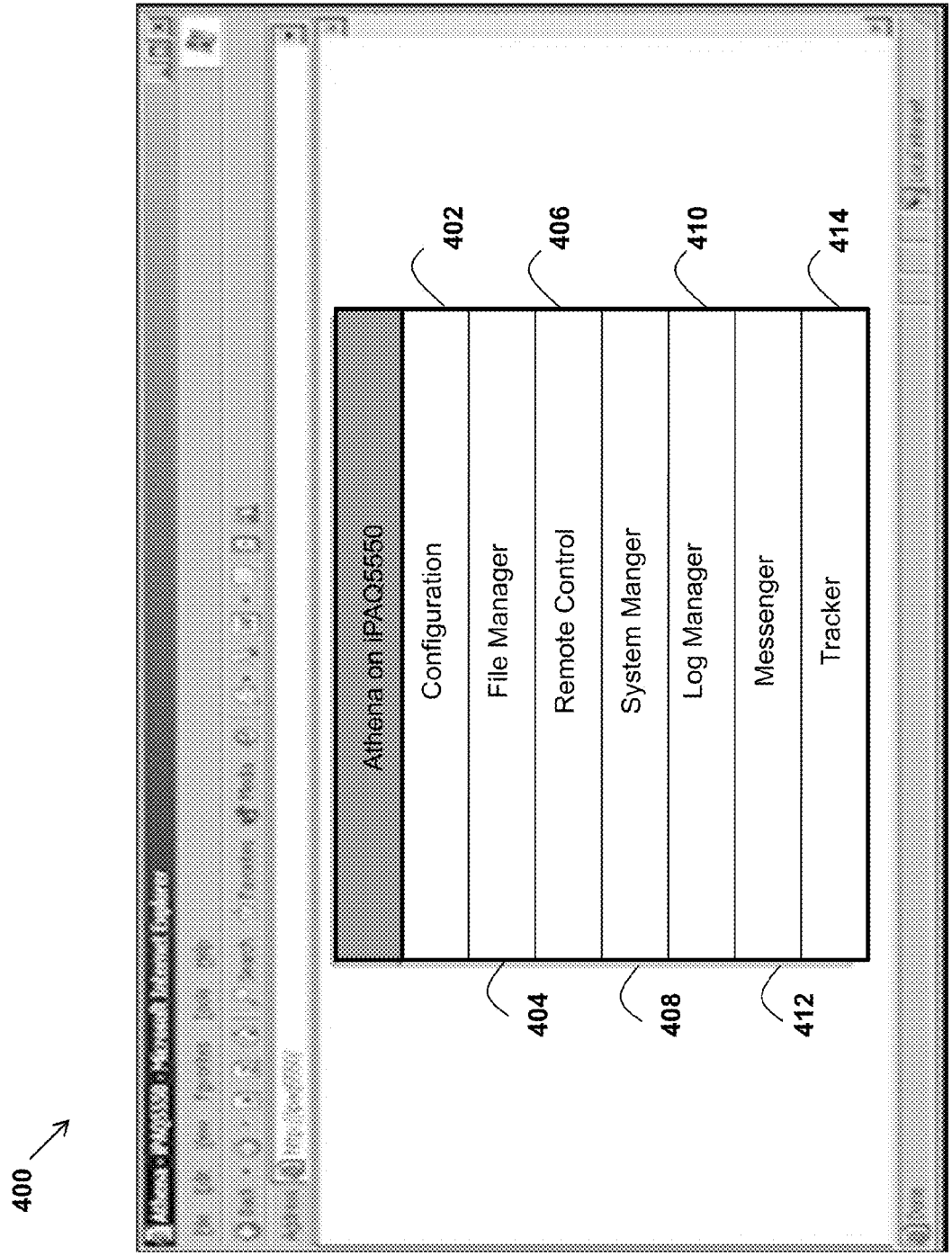
FIG. 5 (SCREENSHOT)

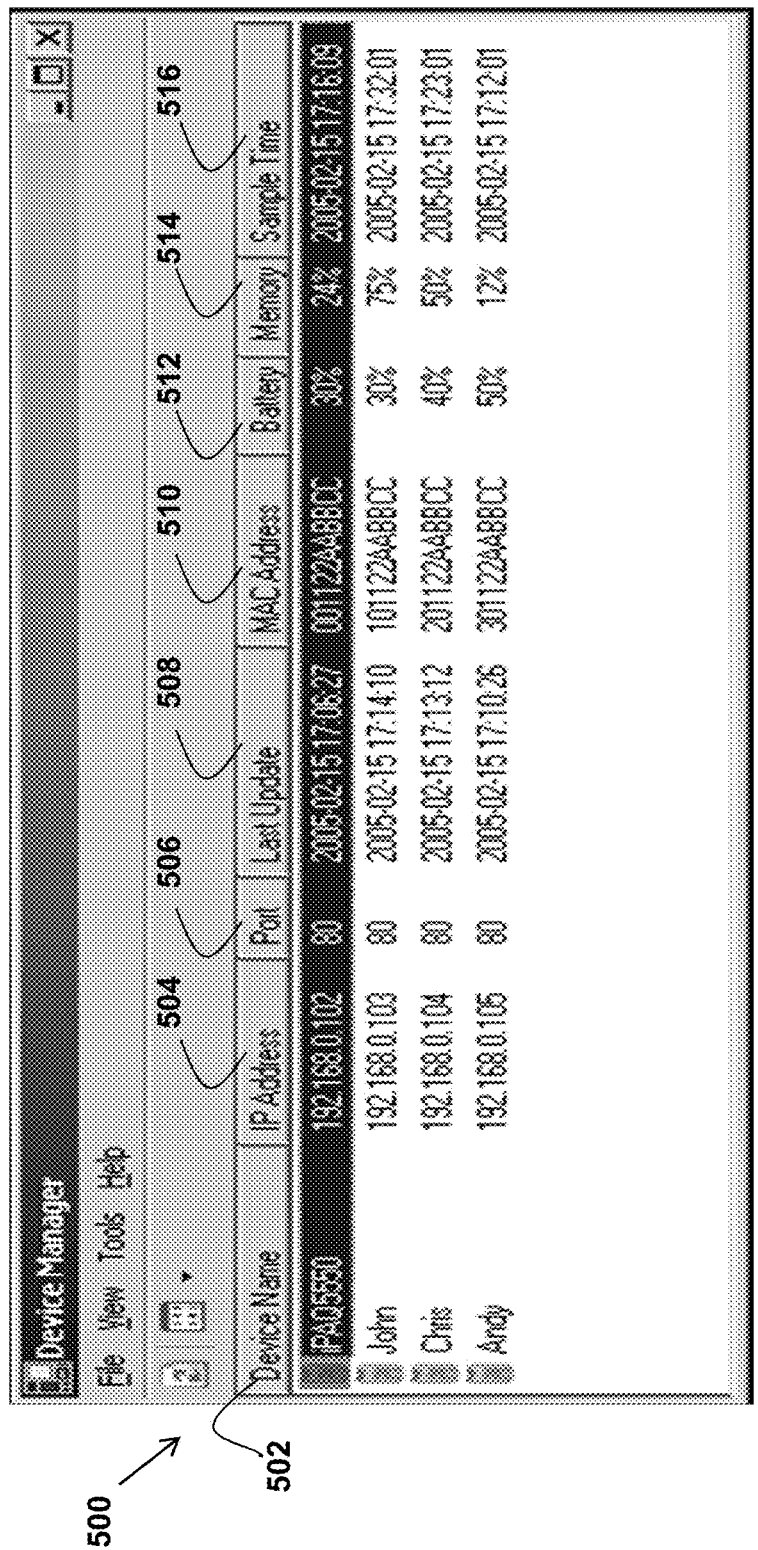
FIG. 6A (SCREENSHOT)

| | |
|---|---|
| Incoming Bytes | 9,975,648 |
| Outgoing Bytes | 49,541,134 |
| GSM Active | No |
| GSM Enabled | Yes |
| GSM Supported | Yes |
| GSM IMEI | 0014491 13 8798412 4 |
| GSM IMEISV | 0014493 18 8798842 02 |
| GSM IMSI | 310410358998636 |
| GSM Home MCC | 764 |
| GSM Home MNC | 1040 |
| GSM Signal | -256 dBm |
| GSM Address | |
| GSM Carrier | |
| GSM Service | |
| GSM Roaming | No |
| GSM State | |
| GSM MCC | 0 |
| GSM MNC | 0 |
| GSM LAC | 0 |
| GSM RAC | 0 |
| GSM CID | 0 |
| GSM BSIC | 0 |
| GSM ARFCN | 0 |
| CDMA Active | No |
| CDMA Enabled | No |

*FIG. 6B (SCREENSHOT)*

FIG. 6C (SCREENSHOT)

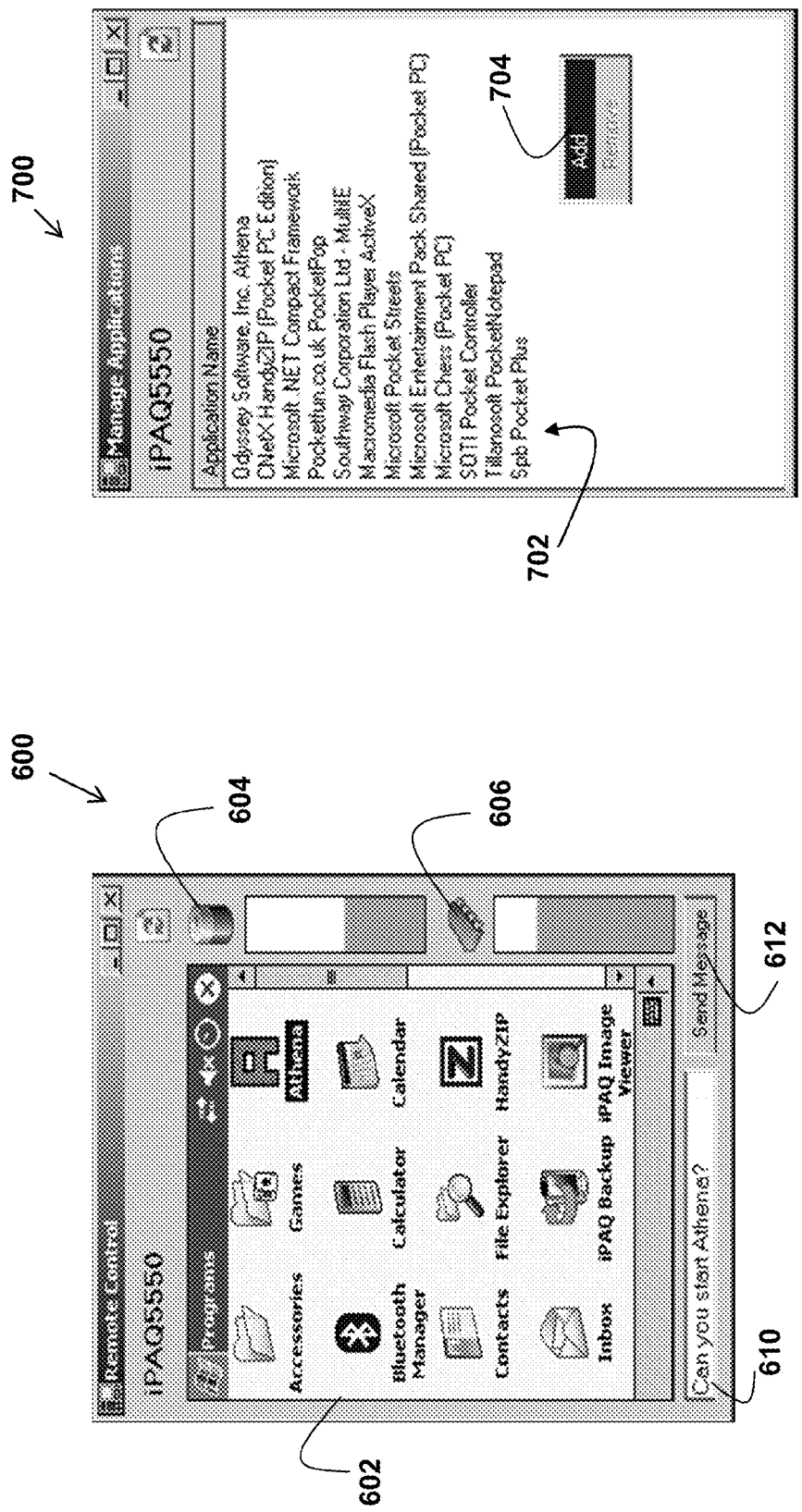

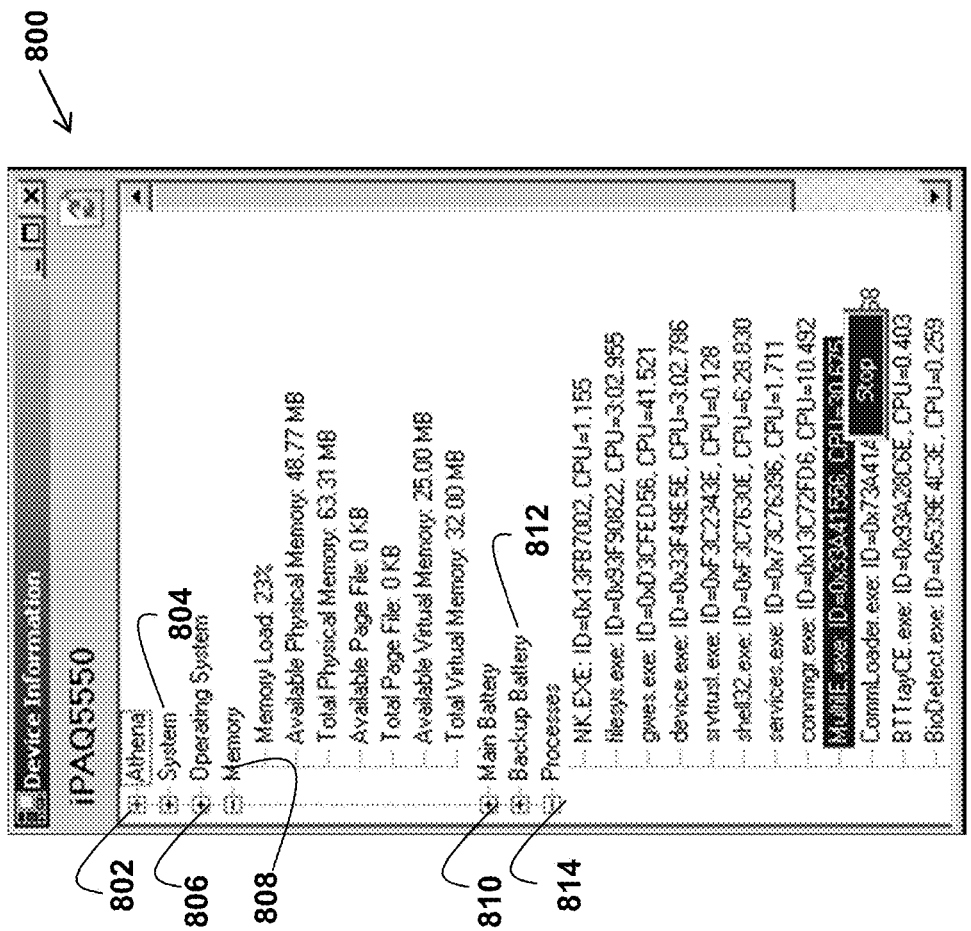
FIG. 9A (SCREENSHOT)

*FIG. 9B (SCREENSHOT)*

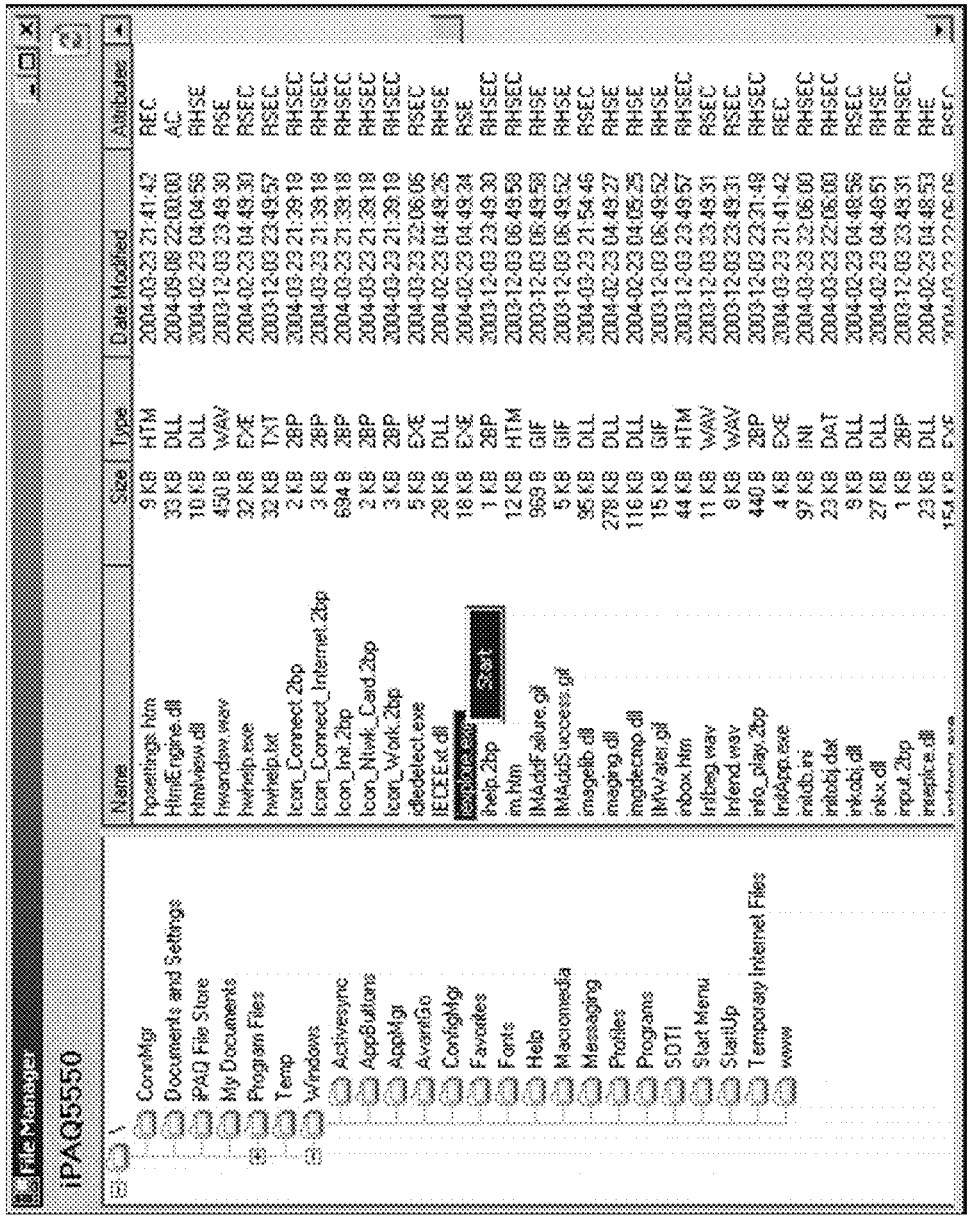
FIG. 10 (SCREENSHOT)

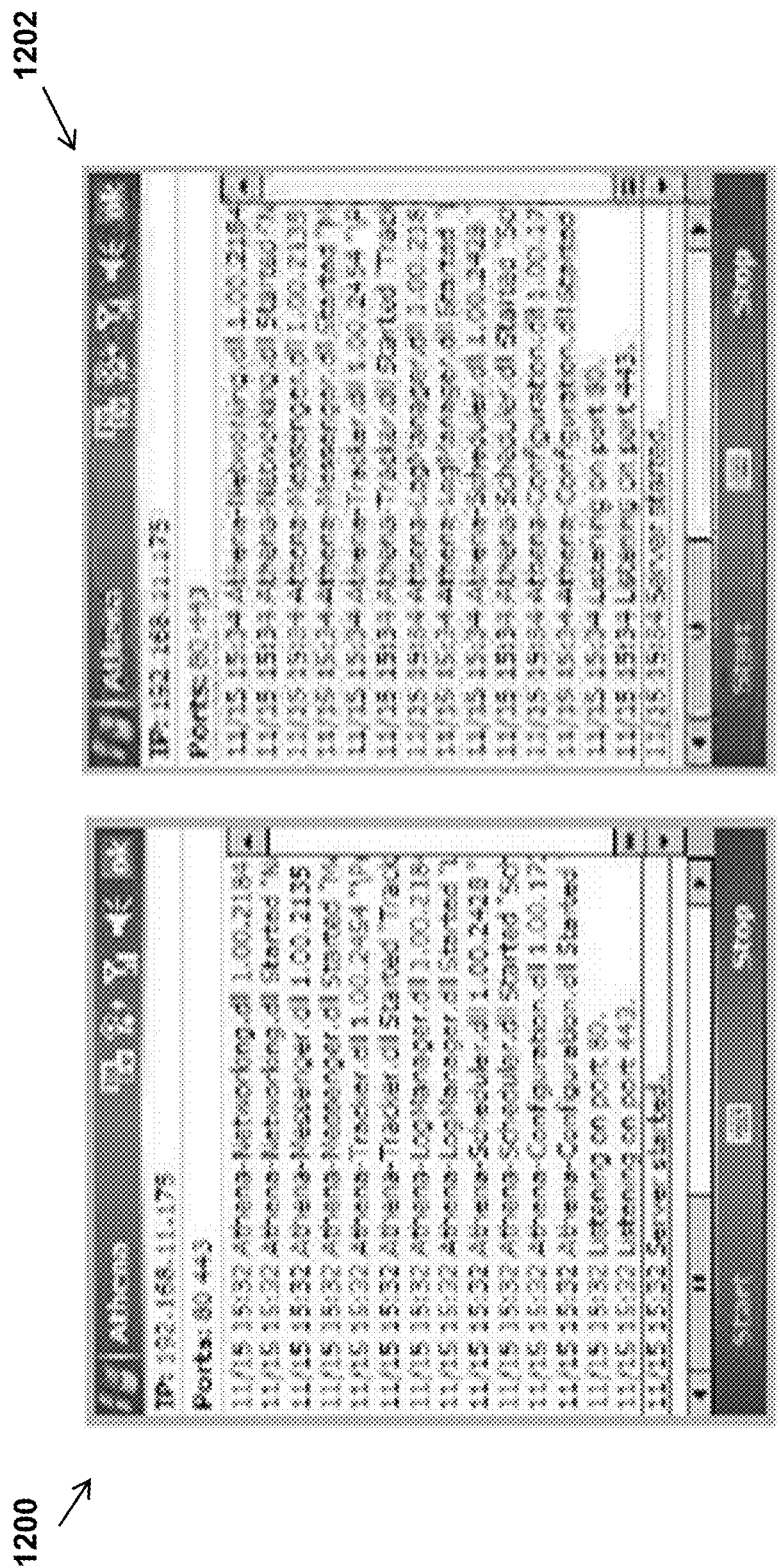
FIG. 13A (SCREENSHOT)

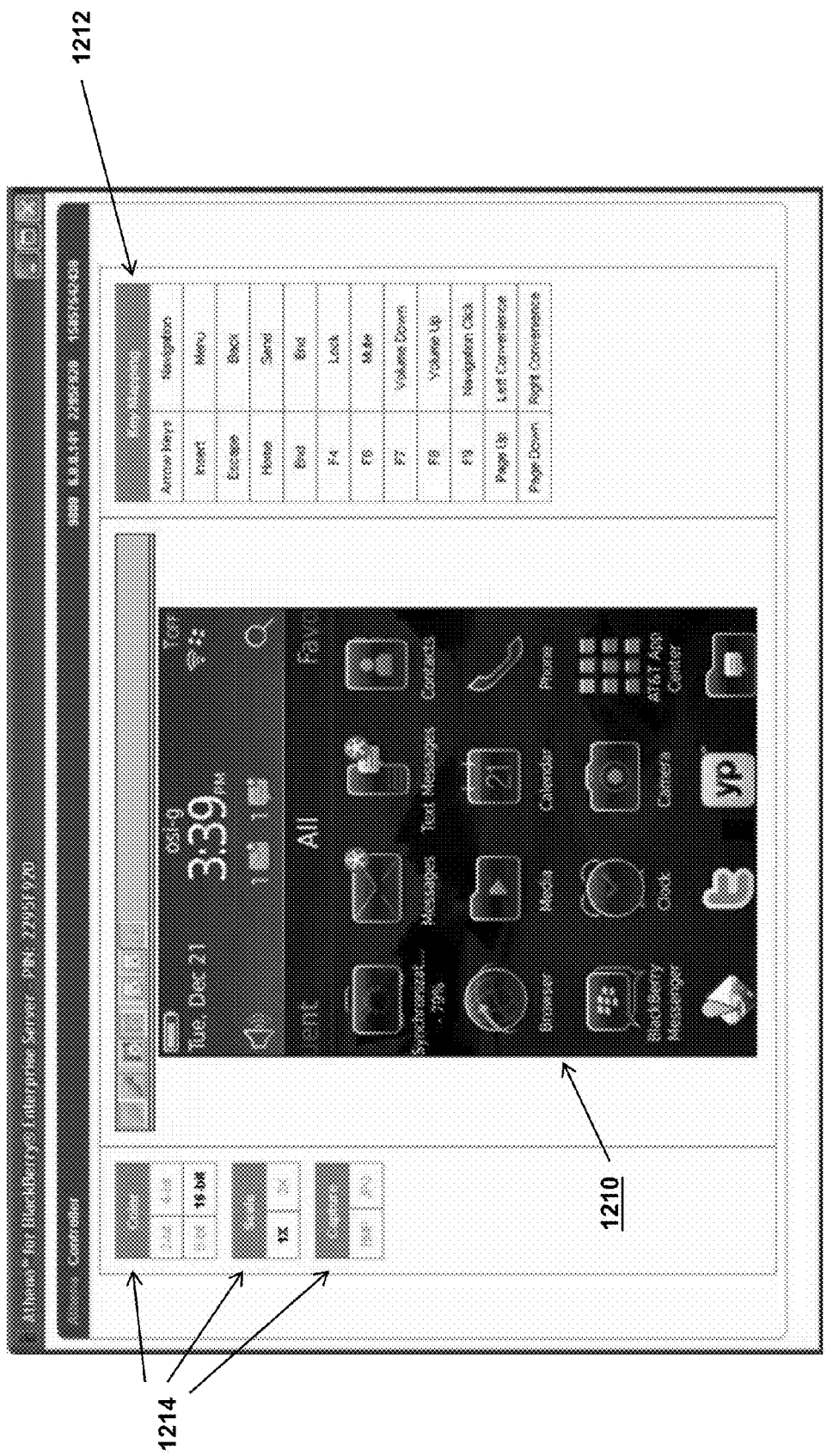
FIG. 13B (SCREENSHOT)

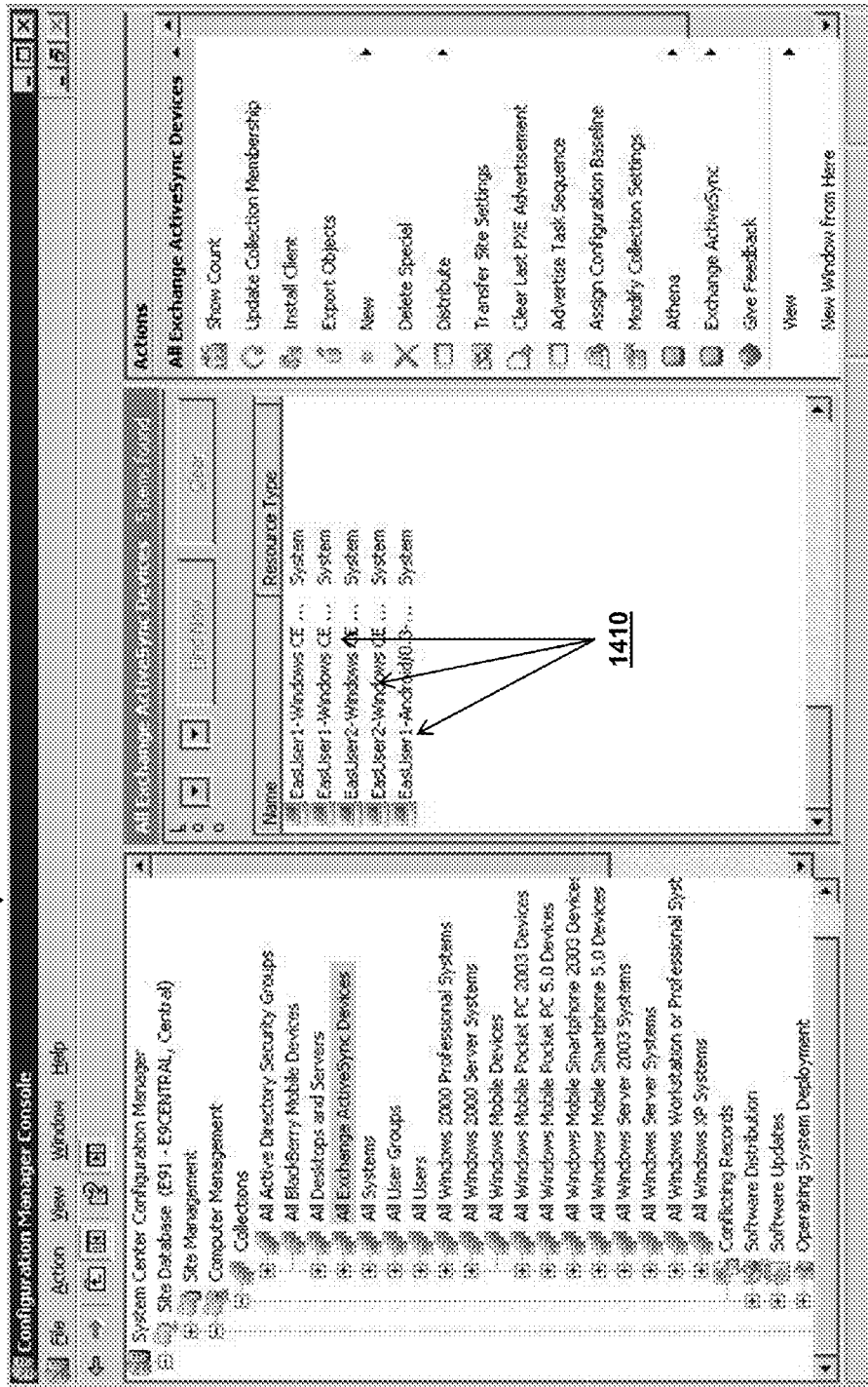
FIG. 16 (SCREENSHOT)

METHOD, SYSTEM, AND COMPUTER READABLE MEDIUM FOR REMOTE ASSISTANCE, SUPPORT, AND TROUBLESHOOTING

CROSS-REFERENCE TO RELATED APPLICATIONS

This applications claims priority to U.S. Provisional Patent Application Ser. No. 61/301,124, filed Feb. 3, 2010, which is hereby incorporated by reference in its entirety.

FIELD

The present disclosure relates to device management. More specifically, the present disclosure relates to remote device management through a central platform.

DESCRIPTION OF THE RELATED ART

The successful deployment and management of mobile or remote devices presents one of the greatest challenges for enterprises and organizations in today's high-tech world. Typically, remote devices enable organizations to be faster, smarter, and more efficient. However, the management and deployment of remote devices creates unique challenges for IT departments. Unlike personal computers (PCs), laptops, and severs, remote devices do not connect to a company's secure network and could be located anywhere. This creates issues for tracking, monitoring, provisioning, and troubleshooting remote devices.

Often times, wireless wide-area networks (WWAN), Wi-Fi, and other networks mask remote device IP addresses, rendering the remote device unreachable from an outside IP connection. A method and system for establishing a reliable connection between a remote device and outside source may be needed since automated software and other updates may be critical for enterprises. Other needs may also require a reliable connection. For example, as more workers rely on remote devices for mission-critical tasks, it may be important to reliably track those devices in case of loss or theft. Unreliable connections may hinder automatic updates to remote devices and make other management tasks difficult.

Although some known remote device management systems offer limited remote device management capabilities, they typically do not allow customizable solutions offering a depth of functionality in an open architecture. Instead, known remote device management solutions rely on proprietary protocols for a broad range of devices. Thus, these systems require proprietary management infrastructure and consoles for operation. In addition, since the proprietary protocol must work with a broad range of devices, the functionality derived from the protocol may not enable a depth of management features.

Several common issues arise when managing remote devices. First, IT administrators may be called on to remotely troubleshoot devices. Without access to device files and settings, this may prove challenging. Other common challenges with remote deployments include how to (a) identify and catalog all deployed devices (b) gather detailed device asset information; (c) monitor device health and status; (d) distribute applications and updates (e) manage device configuration and settings; (f) secure devices to protect sensitive data; (g) reduce the time to resolve help desk tickets; (h) troubleshoot and fix problems remotely; (i) diagnose networking or wireless connectivity issues; (j) assist end-users with operating device applications; (k) track and optimize mobile device data plans; and (l) track mobile device locations.

Because known remote device management solutions rely on proprietary protocols, they typically do not offer these services. Rather, they focus on a shallow area of functionality for a wide variety of enterprises. Further, by relying on proprietary protocols, known remote device management systems may not be customizable.

In addition, users may call on IT department or other support professionals to remotely troubleshoot their remote devices. Because most remote device management systems operate in conjunction with automated servers rather than through other interactive methods, troubleshooting remote devices becomes a complicated task. Further, by relying on automated servers or other large data centers, known remote management solutions may not be extensible for different applications.

In today's modern world security also becomes a concern when managing remote devices. Implementation of customizable security features may be difficult with proprietary protocols and infrastructure.

SUMMARY

Therefore a need has arisen for a remote device management solution which enables customizable and extensible solutions for remote device management.

A further need exists for establishing a reliable connection between the remote device and the management console, server, or workstation even in cases when the IP address of the remote device is masked or unreachable.

A further need exists for ensuring a secure connection with the remote device and the management console, server, or workstation.

A further need exists for an interactive solution for troubleshooting remote devices remotely.

In accordance with the disclosed subject matter, an open standards-based remote device management system is provided that substantially reduces or eliminates problems associated with previously developed remote device management solutions.

The present disclosure enables customizable solutions for device management through the use of an open architecture based on open Internet standards including, but not limited to, HTTP/S, HTML, eXtensible Markup Language (XML), Simple Object Access Protocol (SOAP), and Web Services Description Language (WSDL). An on-device service host (also known as an on-device agent) having application plug-ins, a web server, and security features enables remote device management.

A central management system may remotely execute the application plug-ins, which are encoded on the remote device as dynamically linked library (DLL) files or other executable files. Each of the plug-ins provides different functionality and has its own library of methods which may be remotely invoked. The web server included with the service host provides a Secure Socket Layer (SSL) server and SOAP server and provides access to the plug-ins. The web server makes the plug-ins available as WSDL documents for servers or other management consoles and also as HTML web pages for access through a workstation or other management station. The SSL server enables two-way authentication between the remote device and a central server, ensuring security.

In one embodiment, a tunnel client on the device works in conjunction with a remote tunnel server to provide access to the service host when the remote device has an unreachable IP address.

A technical advantage of the present disclosure enables organizations to develop customizable and extensible device management applications tailored to their unique needs.

Another technical advantage of the present disclosure allows IT administrators or other support professionals to remotely operate a remote device as if actually holding the device in their hands.

In another technical advantage, the present disclosure enables a reliable connection through the tunnel client/server feature and enables a secure two-way authentication through the SSL server.

The teachings of the present disclosure may be tailored to many different types of remote device. By way of illustration and not limitation, these may include Windows Mobile devices, Windows CE devices, Android devices, BlackBerry devices, iOS-based devices, smartphones of all kinds and regular phones, and all manner of embedded mobile or non-mobile devices. All references to specifically named components, functions, and methods are exemplary rather than limiting.

Other aspects and advantages of the disclosure will be apparent from the following description and the appended claims.

DRAWINGS

For a more complete understanding of the disclosed subject matter and advantages thereof, reference is now made to the following description taken in conjunction with the accompanying drawings in which like reference numbers indicate like features and wherein:

FIG. 1 presents a high level diagram illustrating the internet protocols that may be used to expose the device management functionalities of the on-device remote device management architecture;

FIG. 2 illustrates an exemplary embodiment of on-device remote device management architecture integrated with Microsoft System Center Mobile Device Manager 2008 as XML web services;

FIG. 3 provides a pictorial view of the service host architecture;

FIG. 4 provides a pictorial view emphasizing the internal architecture of the plug-in services;

FIG. 5 gives an exemplary web page exposing plug-ins deployed on the remote device;

FIGS. 6A through 10 provide screenshots exposing the device management capabilities of the present disclosure;

FIG. 11A provides a process flow for automatically provisioning remote devices with software or settings;

FIG. 11B provides another process flow for automatically provisioning remote devices with software or settings;

FIG. 11C provides a high level manifest structure;

FIG. 11D provides a process flow for creating a custom software package;

FIG. 11E provides an example of how different software packages may be automatically provisioned to different device types;

FIG. 13A shows a screen capture of a remote device;

FIG. 13B shows an embodiment of the capability for an administrator to remotely control a device;

FIG. 16 is a screenshot of a management console for an agentless embodiment of the present disclosure.

DETAILED DESCRIPTION

Figure 1:
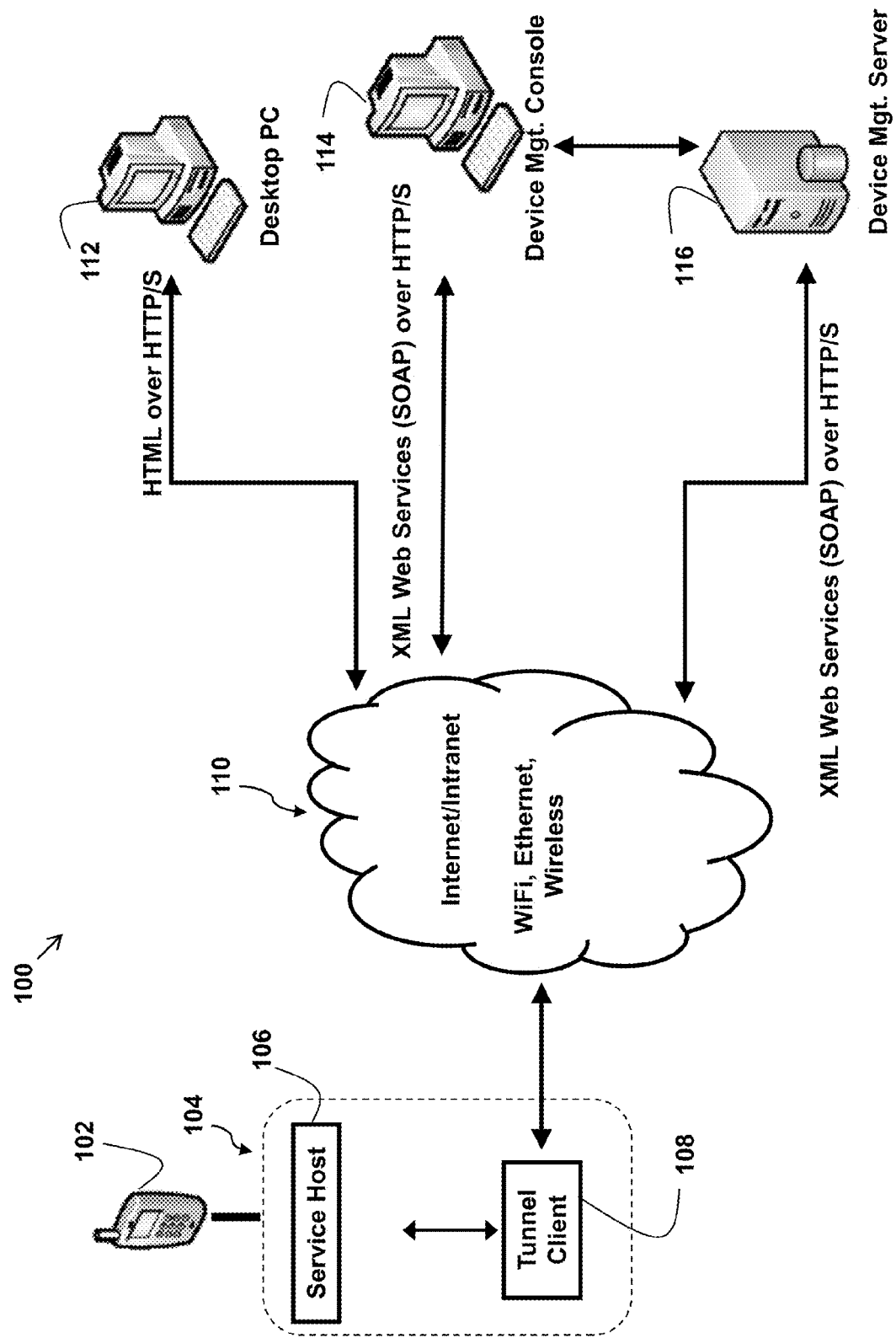

Exemplary embodiments of the disclosed subject matter are illustrated in the FIGURES, like numerals being used to refer to like and corresponding parts of the various drawings.

The disclosed subject matter relates to IT management systems. Features of the disclosed subject matter include the ability to manage, provision, monitor, and troubleshoot remote devices. Further, the present disclosure enables tracking the usage statistics and location of remote devices.

One aspect of the present disclosure involves positional tracking of mobile devices. Most mobile devices contain a GPS receiver that allows the software of the present disclosure to access physical location data with a high degree of accuracy. Even devices that do not contain GPS hardware may be located (generally with less precision) by triangulation based on cellular towers. By tracking the location of mobile devices, an administrator may realize many benefits. For example, it may be discovered that an employee has been somewhere he was not authorized to be, or that he has left work during work hours. For a shipping company, for example, it may also be useful to track historical records of how long various routes to a destination take in order to optimize efficiency. Detailed information about the status of the GPS tracker may also be collected and logged, such as satellite information and dilution of precision.

Further, if a user loses his device, an administrator may be able to locate it for him. And if the device is not recoverable, it may be remotely locked and wiped to avoid the possibility of an information leak. If the device happens to be offline when the administrator tries to lock and/or wipe it, the system of the present disclosure may simply queue the lock/wipe request and wait until the device reestablishes a connection. Once the device connects, it may immediately be locked to prevent any further access.

The present disclosure enables customizable solutions for device management through the use of an open architecture based on open internet standards including, but not limited to, HTTP/S, HTML, eXtensible Markup Language (XML), Simple Object Access Protocol (SOAP), and Web Services Description Language (WSDL). An on-device service host having application plug-ins, a web server, and security features enable remote device management; in some embodiments, the on-device service host may be omitted.

The disclosed subject matter allows for an inventory of remote devices and provisioning of software on the devices. The present disclosure allows access to data on remote devices and the ability to manipulate the data. In one embodiment, the management system may not only provision devices with software, but also modify device settings. In another embodiment, the management system of the present disclosure provides features for remotely operating a remote device. In another embodiment, the management system of the present disclosure allows applications to be automatically downloaded to the device and updates to be applied to device software. Other aspects of the present disclosure will become more apparent from the following description and FIGURES.

Much of the examples and discussions of the present disclosure will continue with respect to Windows-based remote devices. However, the teachings of the present disclosure may be extended to other systems such as those manufactured by Symantec and other operating systems including, but not limited to, Linux, Unix, and OS X.

For the purposes of the present disclosure, a "remote device" or a "mobile device" may be used interchangeably to refer to any handheld device having an IP-based internet connection including, but not limited to, cell phones, smartphones, or personal digital assistants (PDAs), as well as to any remote embedded device having an IP-based internet connection including, but not limited to, vending machines, kiosks, price checkers, and the like. It will be clear to one of ordinary skill that many of the plug-ins of the present disclosure will be applicable to only certain devices, but the modular nature allows a user to install only the features desired, while the device agent software can work unmodified or essentially unmodified across all devices within a class.

FIG. 1 presents a high-level diagram illustrating the internet protocols that the present disclosure employs to expose the device management functionalities of on-device remote device management architecture 100. Remote device 102 is encoded with on-device agent 104. On-device agent 104 includes service host 106 and tunnel client 108. Device management architecture 100 offers management functionalities over any IP-based wired or wireless network 110. On-device agent 104 provides device management functionalities as web services across standard internet protocols to central management systems such as, but not limited to, personal computers (PCs) 112, existing enterprise device management infrastructures including device management consoles 114, and device management servers 116.

The reader will note that tunnel client 108 may not be necessary for the operations of management architecture 100, but provides a reliable connection in those cases where the IP address of remote device 102 is masked or otherwise unreachable. Tunnel client 108 operates to create a persistent connection to device management servers 116. This is advantageous compared to having device management servers 116 initiate the connection, because remote device 102 may be behind a firewall or NAT device and thus unreachable; further, this implementation prevents the possibility of denial-of-service attacks against remote device 102, since remote device 102 need not be configured to accept incoming connections.

In an exemplary embodiment, PC 112 may access device management functionalities from a web browser interface and perform device management activities such as interactive troubleshooting, corrective action, and remote control from customizable HTML web pages. Other operations such as device provisioning may also be performed through customizable HTML web pages.

The same functionalities are offered as XML web services to any existing device management console 114 or device management server 116 that may call XML web services. Functionalities relating to device resource reporting, such as device identity information (e.g., IP address, unique device ID, phone number) and the logging of devise assets are offered to any device management server 116 that may call XML web services.

Service host 106 provides both of these types of interface so that its functionalities may be exposed in a visual way to a remote operator, as well as in a programmatic way. Thus, management console extensions may be written to access and modify device data via the XML web services API, and then present whatever interface is desired to the user of device management console 114.

The open Internet standards of service host 106 may employ protocols such as, but not limited to, HTTP/S, HTML, XML, SOAP, and WSDL to provide remote mobile device management capabilities to a central management system through an IP-based wired or wireless network. IP-based wired or wireless network 110 may include, but is not limited to, a wireless wide area network (WWAN), wireless local area network (WLAN), dial-up, Wi-Fi, cradle and satellite connections.

By employing an open architecture for device management through open internet standards, the present disclosure allows management of remote devices without the need for proprietary management systems. Console extensions enable existing infrastructure such as device management console 114 and device management server 116 to work in conjunction with service host 106. This allows console 114 and server 116 to remotely and automatically manage and operate remote device 102.

Figure 2:
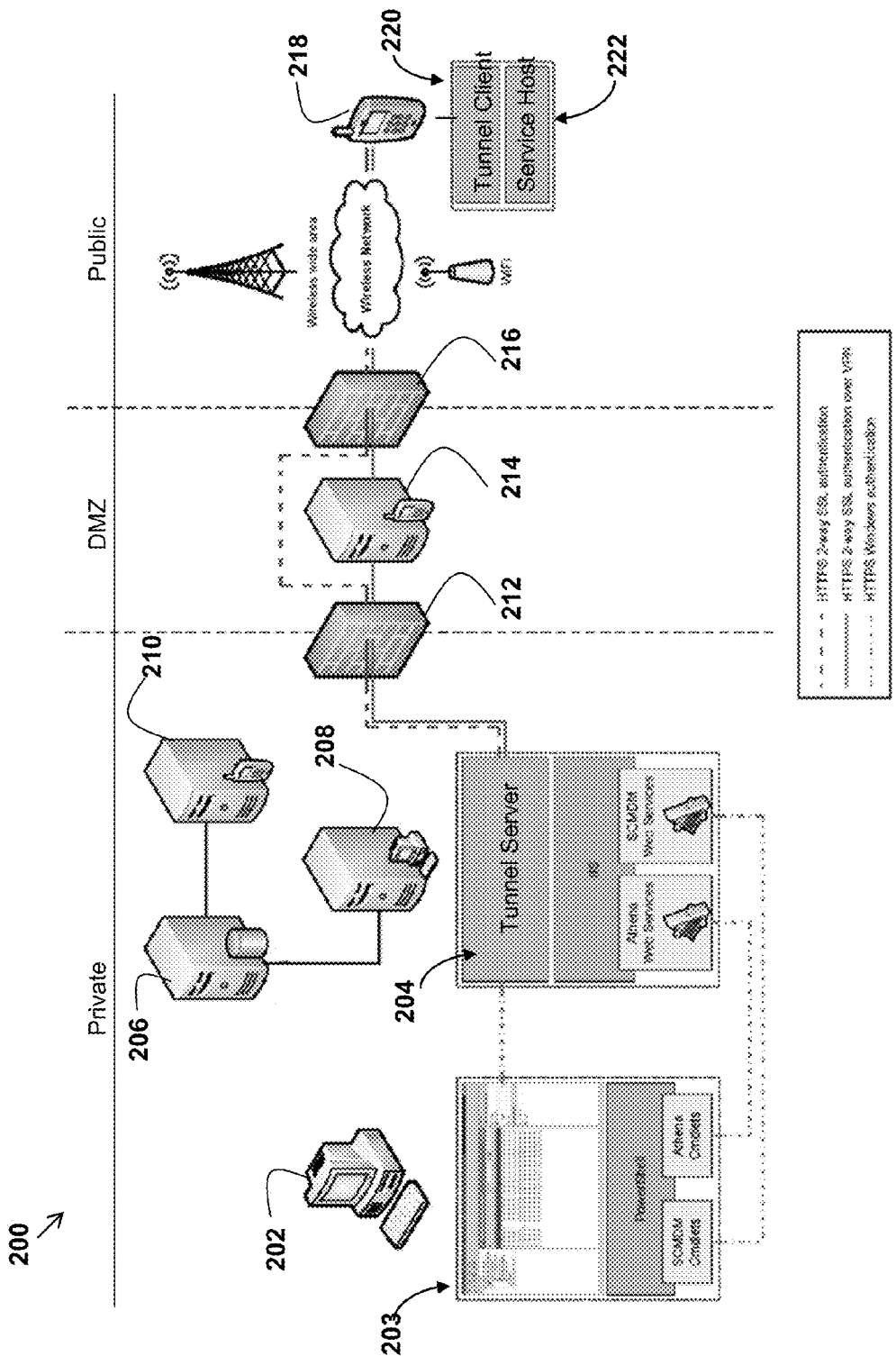

FIG. 2 illustrates an exemplary embodiment 200 of on-device remote device management architecture integrated with Microsoft System Center Mobile Device Manager 2008 as XML web services. Other remote device management systems such as, but not limited to, Microsoft System Center Configuration Manager 2007 and Microsoft Systems Management Server 2003 may also be employed when managing remote devices. Console extensions allow service host 222 to communicate with existing infrastructure.

Microsoft Corporation offers a web services environment for programming known as the ".NET environment." As noted earlier, the present disclosure is not limited to Windows based remote devices or management systems, but the open internet standards-based remote device management system of the present disclosure may be used in conjunction with any operating system or management system. Other environments capable of developing web services based applications through open internet standards may also be used in conjunction with the present disclosure.

Remote device 218 has been encoded with the on-device remote device management architecture comprising tunnel client 220 and service host 222.

Tunnel client 220 communicates with associated tunnel server 204 via HTTPS. In some cases, tunnel client 220 may not be necessary for use in conjunction with service host 222. For example, if remote device 218's IP address is reachable, the system of the present disclosure may operate without tunnel client 220.

Tunnel client 220 provides a continuous tunnel header capable of being recognized by tunnel server 204 and creating a communications tunnel through which communication to service host 222 is provided.

In cases where remote device 218's IP address becomes translated or unreachable for some other reason, tunnel client 220 works in conjunction with tunnel server 204 to establish a connection for accessing service host 222. For example, in the case of Wi-Fi networks, switches or routers along the network may mask the individual remote device IP address through network address translation (NAT) or otherwise, rendering the device unreachable. In the case of interactive operations such as querying, sending files, or re-setting remote device 218, tunnel client 220 ensures a connection from device console 202 to service host 222.

To ensure a reliable connection, tunnel client 220 initiates an up-bound "keep alive" connection with tunnel server 204. Tunnel server 204 thus has access to remote device 218 through the service point or named tunnel. Device console 202 may then access service host 222 through tunnel server 204 and the named tunnel.

Typically, a unique device attribute such as phone number or the unique device ID drives the name of the tunnel. Thus, the named tunnel does not change even after an intermittent loss in connection. If an intermittent loss in connection does occur, tunnel client 220 accepts the loss and then reconnects to tunnel server 204. In one embodiment, tunnel client 220 establishes connections with tunnel server 204 based on a re-try cycle once a connection is lost.

Tunnel server 204 further may intelligently handle requests from device console 202 or another management system. Once tunnel server 204 receives a request from console device 202 for remote device 218, tunnel server 204 looks for the named tunnel to remote device 218. If none exists, tunnel server 204 may hold the request until tunnel client 220 initiates a "keep alive" connection with tunnel server 204. Typically, tunnel server 204 holds the request at least as long as the re-try cycle for connections. Once the correct tunnel has been established and identified, tunnel server 204 passes the connection to device console 202 and the end-to-end connection is established.

In one embodiment, the tunnel server and tunnel client use a secure HTTPS tunnel that uses two-way SSL certificate-based authentication to provide a custom connection gateway from mobile devices to a site. The tunnel client establishes and maintains a secure, mutually authenticated, 128-bit SSL connection with the tunnel server-side components.

Device management functionalities may be offered as a visual HTML interface as well as an XML web services interface to integrate with an existing management infrastructure. A visual HTML interface may be particularly useful for, for example, remotely controlling remote device 218 and viewing whatever is being shown on its screen. The web services interface may be more advantageous for providing programmatic access to the device properties, file system, settings, and other attributes. For example, a console extension running on device console 202 may provide a file explorer that looks and feels like a native application under whatever operating system runs on device console 202 and displays the file system information returned vie the web services API. External firewall 216 and internal firewall 212 provide firewall and security features. Gateway server 214 allows access through a virtual private network (VPN). Existing enterprise management framework, comprising device management server 208, database server 206, and enrollment server 210, provides support for XML web services (SOAP) so that the XML web services may be presented as integrated programmatic interface 203 on device console 202.

Figure 3:
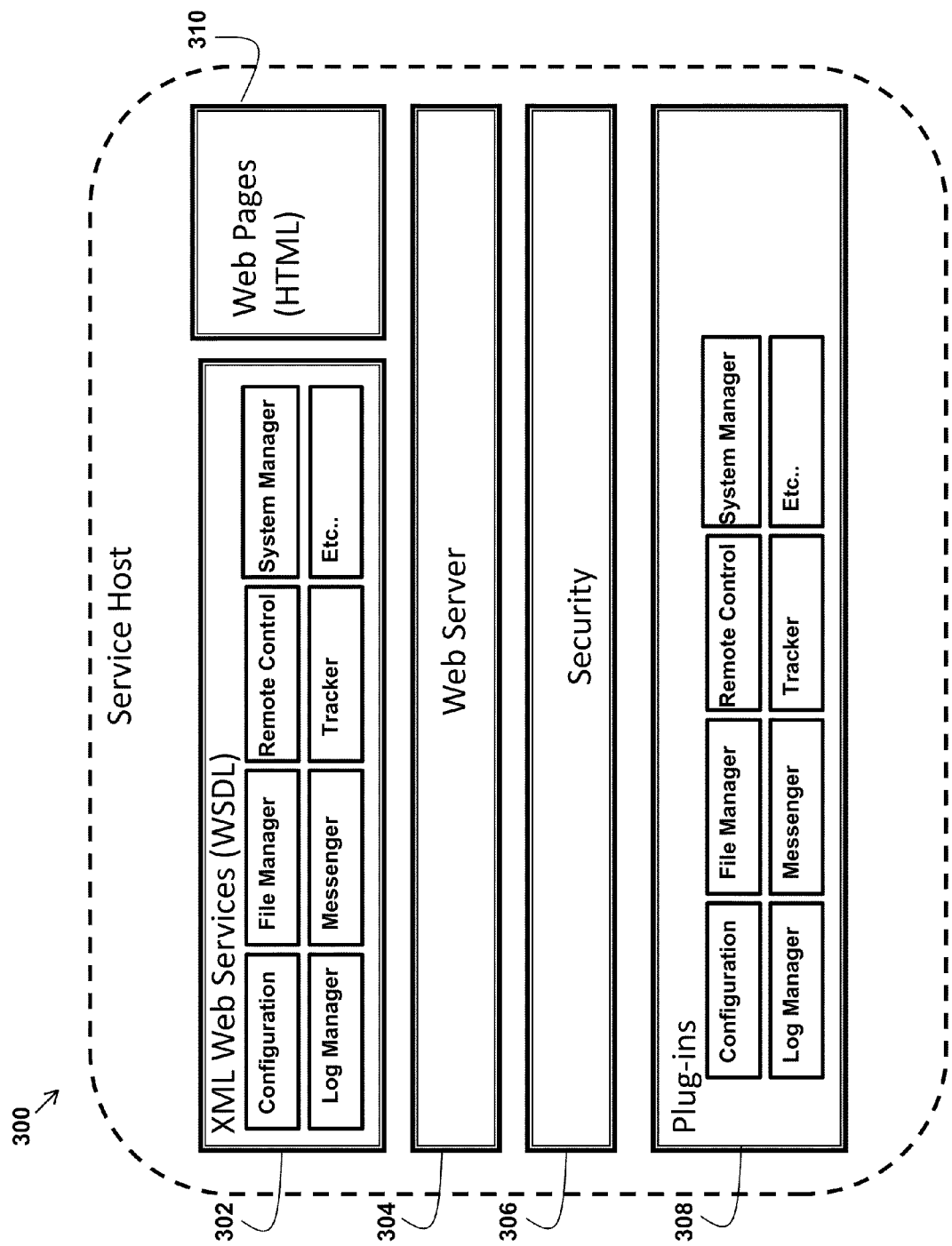

FIG. 3 provides an illustrative representation of the architecture of service host 300. Service host 300 provides remote device management functionalities through programmatic interfaces accessible according to standard Internet protocols and is installed on a remote device. Service host 300 hosts a plurality of modular application plug-ins 308 providing an array of device management functionalities. Plug-ins 308 may exist as dynamically linked libraries (DLLs) or other executable code files on the remote device. Plug-ins 308 may be provided in packages of related functionalities known as "feature packs," according to the needs of a particular user; they may also be augmented with other plug-ins after initial installation.

Web server 304 provides access to device management functionalities through open Internet standards. Web server 304 may serve both web pages and XML service calls, and it may include Simple Object Access Protocol (SOAP) and Secure Socket Layer (SSL) servers. The SSL server may provide a secure two-way authentication between a client and a server or a secure one-way authentication from a server to a client.

On-device web server 304 handles web page requests. Remote device management features are exposed to calling clients as XML web services 302 and/or web pages 310. Security component 306 provides security features such as protection from unauthorized calls.

XML web services 302 handle requests to plug-ins 308 by transmitting and processing WSDL documents. Plug-ins 308 may be remotely accessed by desktops, consoles, or other management stations through remote procedure calls (RPCs). Typically, but not necessarily, the RPC relies on XML as the message format and is transmitted via an applications layer protocol such as HTTP.

The following describes the functionalities and methods of plug-ins 308 provided by service host 300 in the exemplary embodiment. However, the modular and open architecture of the present disclosure allows for an unlimited number and any combination of device management plug-ins desired to perform comprehensive remote device management. Additionally, although these functionalities are described as available according to XML web services, the same operations may be performed according to other programmatic interfaces such as, but not limited to, HTML web pages.

WSDL documents 302 provide information necessary to remotely execute plug-ins 308. WSDL documents 302 include information about the location of plug-ins 308 and what information is needed to run plug-ins 308. WSDL documents 302 may further include other information such as the business hosting plug-in 308, the kind of service, associated keywords, and other information about plug-in 308. Through the use of WSDL documents 302, plug-ins 308 may be platform independent, distributed, and secure.

WSDL documents 302 allow plug-ins 308 to be automatically executed without human intervention. Thus, a management server or management console sends a SOAP request to automatically execute plug-ins 308. WSDL document 302 then parses the information, making sure the SOAP request includes the required information. WSDL document 302 then sends the appropriate information to the appropriate plug-in 308.

The SOAP request may include, but is not limited to, a one-way operation, request-response operation, solicit response operation, or notification operation. Typically, the SOAP request includes an XML definition of the request and required information to execute plug-ins 308 and an RPC or HTTP definition for message transmission.

In cases where a developer independently creates applications employing plug-ins 308, the message transmission information may be automatically created by the development environment.

In one embodiment, ViaXML2 communicates with web server 304. ViaXML2 is a high performance XML web services engine and remote application development framework. ViaXML2 implements a private Universal Description, Discovery, and Integration (UDDI) registry that contains service descriptions of the particular services offered. The UDDI registry includes information such as information about the web services offered and details about the service host 300.

The UDDI registry may be unnecessary in some embodiments. The service description could be found from other sources including, but not limited to, an FTP site, a web site, or a local file.

A user searches the UDDI registry for a service description of the web service offered. The user then sends a SOAP request to service host 300. The SOAP request then binds to the appropriate WSDL document 302 which provides the necessary information to plug-ins 308. Plug-in 308 executes the requested operation and may send appropriate information back to the user in XML or another format.

In this scenario the user may be a person invoking plug-ins 308 through a web browser, a program automatically run on a server or console, or another web service.

Service host 300 may also host web pages 310 wherein a user may remotely execute plug-ins 308. This embodiment employs HTTP/S and HTML as the message formats.

Thus, the present disclosure employs open internet standards such as HTTP/S, HTML, SOAP, WSDL, and XML, enabling remote executions of plug-ins 308. As mentioned earlier, the modular nature of plug-ins 308 allows plug-ins to be updated and new plug-ins to be deployed on service host 300. Independent developers may further build applications to take advantage of the functionality offered by plug-ins 308, allowing customizable features designed for the unique needs of their own organizations.

Figure 4:
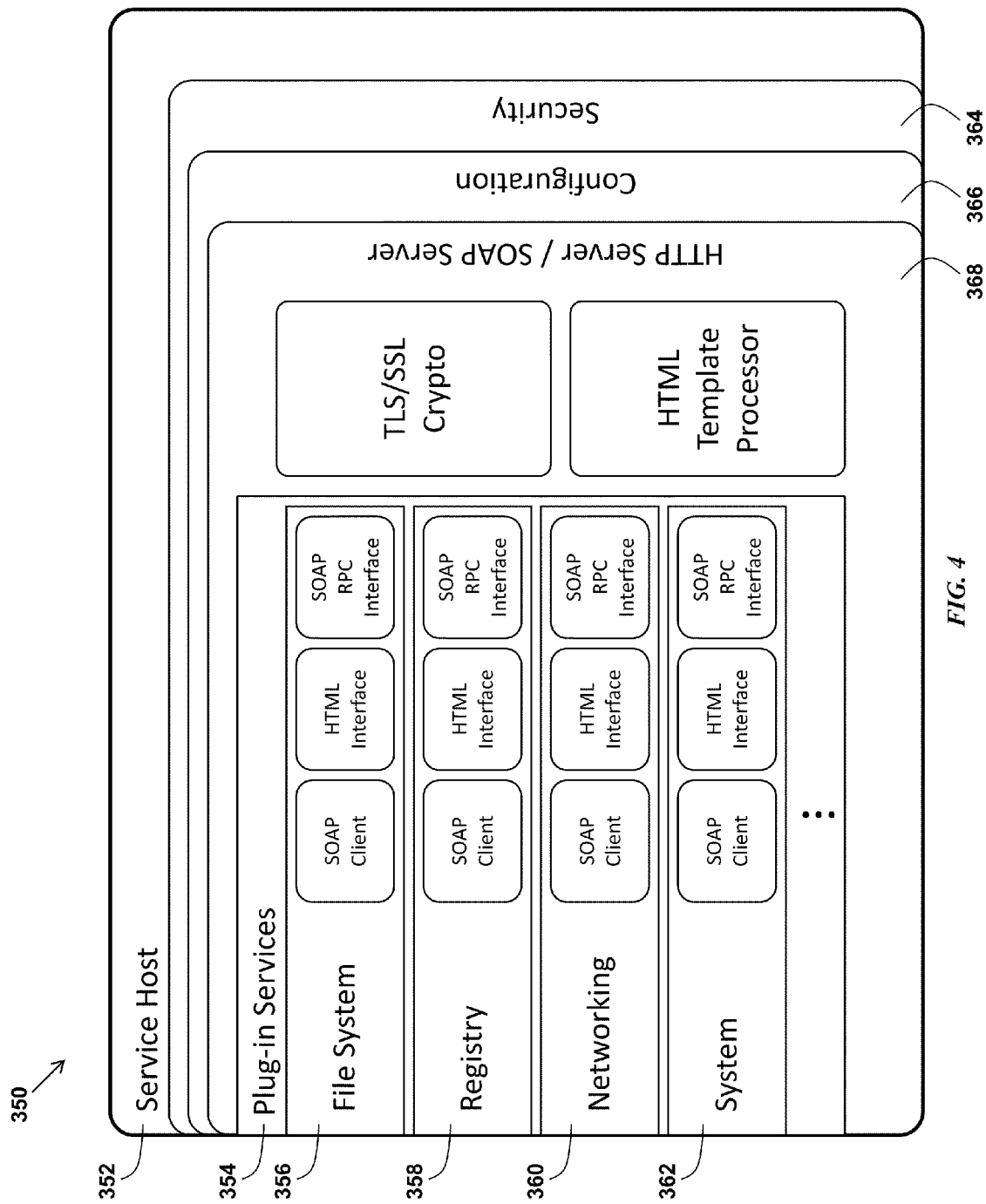

FIG. 4 provides pictorial view 350 emphasizing the internal architecture of the plug-in services file system 356, registry 358, networking 360, and system 362, etc. Service host 352 houses security protocols 364, configuration protocols 366, web server 368, and a plurality of plug-in services 354.

Registry 358 provides access and management of the Windows registry on supporting devices. Options include opening, searching for and creating registry keys, importing and exporting registry files, creating registry values, copying, renaming, deleting, and setting registry values. For example, access to HKEY_USERS and other standard registry entries is enabled.

Web server 368 is both an HTTP server and SOAP server. Thus web server 368 provides access to plug-in services 354 as web pages by utilizing an HTML template processor to present the HTML interface for each plug-in service across HTTP protocols. Web server 368 may also include TSL/SSL cryptographic security measures to ensure only validated users may access plug-in services 354. Each plug-in service may be accessed by its HTML interface or by its SOAP RPC Interface (according to a SOAP client housed within the plug-in service which processes the web services request).

In one embodiment, the present disclosure may include a component operable to restrict user activity on a mobile device to a set of authorized programs and configurations. This AppCenter component replaces the graphical user interface of a device with a secure launch screen that displays only approved programs and options. Any unauthorized program that attempts to start (either automatically or by user control) is immediately terminated.

AppCenter is intended for use on remote devices where only specific programs are allowed to be used. It can be configured to lock users out of critical and sensitive areas of the device. For example, it may be useful in a kiosk application where the user can only run a specified information application. The application may be auto-started whenever the kiosk hardware is rebooted or the application is terminated.

AppCenter works in two main modes: user mode and administration mode. User mode presents users with the AppCenter launch Screen, which lists applications that are approved for use. The user can only access the applications that are approved and configured for use. In administration mode, administrators can configure AppCenter by adding programs, enabling or disabling features for use, and changing other options.

The following views in FIGS. 5-10 represent only exemplary designs for exposing the functionality of plug-ins 308 to users through a web browser or other means. Other formats may be known to those having ordinary skill in the art and could be used without departing from the scope of the disclosed subject matter.

FIG. 5 shows exemplary web page 400 exposing the on-device agent plug-ins 308 of FIG. 3 for remote access from a central management system such as a PC. Web page 400 lists available plug-ins through hyperlinks 402 through 414.

In one embodiment, web page 400 exposes configuration 402, file manager 404, remote control 406, system manager 408, log manager 410, messenger 412, and tracker 414 plug-ins. Other customizable plug-ins deployed on the service host may also be accessed through web page 400.

A central management system, for example desktop PC 112 of FIG. 1, may access web page 400 by entering either the device name or IP address as the URL. Web page 400 then displays the available plug-ins as hyperlinks. Web page 400 may be customized based on an organization's unique needs and the on-device plug-ins available.

Configuration 402 allows a user to change the configuration settings of the on-device service host and the on-device plug-ins themselves. Using the configuration plug-in, a client may retrieve all of the configuration files as an array of strings, and a client may identify the name of the service host 300 configuration file. This information allows each file to be read and written, making it very simple to implement a remote configuration tool. The configuration plug-in may also restart service host 300 and the remote device itself.

File manager 404 provides access to the file system of the device. The file manager plug-in enables the remote uploading and downloading of files to and from the remote device. A remote administrator may retrieve the files and folders in a specific folder of the device system as an array of objects. He may then copy, move, rename, and delete each file or folder. For example, information about a specific file or the amount of free memory on the device may be retrieved. Performance information may be displayed, including information about device performance, over time. The detailed information may include selections for memory, power, network, and wireless. All performance information may be displayed in a graphical format, and specific performance ranges can be selected and viewed on each graph. Provisioning status may also be displayed, including information about currently installed applications that were installed according to the present disclosure, and also a history of provisioning actions done on the device. For example, package name and if the package was successfully installed. This capability is obviously useful in many troubleshooting scenarios, but also in the case where a user has trouble finding a file on his device (e.g. the user saved the file in the wrong place). The user can call the administrator and simply ask where the file is, and then the administrator can search the file system remotely and place the file in the correct directory.

Remote control 406 enables remote control of the device by a web browser or administration console. The remote control plug-in allows an administrator to interact with the remote device screen. The remote device screen may also be captured and saved to an image file. An administrator may also retrieve the port that the remote control plug-in is using to receive command messages.

System manager 408 enables a user to remotely retrieve device system information such as a current list of installed applications and running processes. It also enables a user to remotely manage the device, including functionalities such as installing and removing on-device applications, starting and stopping on-device processes, registering and unregistering on-device components, and re-setting the device.

Log manager 410 enables users to store device information in an on-device log that may be push transmitted (initiated by the device) to a server by using file transfer (FTP) or XML web services (HTTP/XML). The device information may be retrieved from any of the other plug-ins.

Messenger 412 enables a user to send messages to the device user in a custom message box on the device. The user may optionally specify message attributes such as font size, a sound to be played, etc.

Tracker 414 enables the device to report to a server. The tracker plug-in sends updated reports (including the identity and name of the device) according to a set time interval by HTTP to a server.

Tracker 414 enables automatic device reporting to a server when a specific event occurs and/or a specified amount of time passes. When an event occurs, Tracker transmits configurable data to a server. The data can contain device information, current network identification, and the like. For example, when an IP address changes, a payload (data and identification) can be sent to alert the server of the change.

The occurrence of certain events, such as a network change or passage of time, can trigger an update. For example, tracker 414 may only run when a device is docked, which may be accomplished by detecting a network change.

The on-device agent further supports the creation of customizable plug-ins developed by any environment which supports XML web services. In one embodiment, a developer may create plug-ins through the use of Microsoft Visual Studio .NET 2003. Table 1 below shows exemplary URLs which may be used as a Web Reference for accessing each of the plug-ins.

TABLE 1

WSDL URL for Each Plug-ins

| Plug-in | URL of WSDL Document |
| --- | --- |
| Configuration | http://device-name/wsdl/athena-configuration.wsdl |
| File Manger | http://device-name/wsdl/athena-filemanager.wsdl |
| Remote Control | http://device-name/wsdl/athena-remotecontrol.wsdl |
| System Manager | http://device-name/wsdl/athena-systemmanager.wsdl |
| Log Manager | http://device-name/wsdl/athena-logmanager.wsdl |
| Messenger | http://device-name/wsdl/athena-messenger.wsdl |
| Tracker | http://device-name/wsdl/athena-tracker.wsdl |

Independent developers may create their own applications having access to each of the plug-ins mentioned heretofore as well as other plug-ins deployed on the remote device. For example, the configuration plug-in makes the functions shown in Table 2 available. The reader will note that other plug-ins make other functions available. Further, the configuration plug-in makes other functions not shown herein available.

TABLE 2

Exemplary Web Services Methods for the Configuration Plug-in

| XML Web Service Method | Description |
| --- | --- |
| ListConfigFiles | Get a list of configuration files |
| GetHostConfigFile | Get the name of the configuration file |
| ReadConfigFile | Read the configuration file |
| WriteConfigFile | Write the configuration file |
| RestartHost | Restart the service host |
| RestartDevice | Restart the device |

The configuration plug-in may enable the retrieval of all configuration files using the ListConfigFiles function. The ListConfigFiles function returns the files as an array of strings, and the GetHostConfigFile returns the name of the main configuration file. Using this information, each file may be read and written. The plug-in thus enables developers to implement a remote configuration tool.

Referring back to FIG. 1, on-device agent 104 provides remote device support through a central management system. A developer may create applications for remote device management. On-device agent 104 offers device management functionality using open standards such as, but not limited to, HTTP/S, HTML, XML, SOAP, and WSDL. Referring now to FIG. 3, Web server 304 provides access to plug-ins 308 of service host 300. Web server 304 provides access to plug-ins 308 through customizable web pages which may be accessible from a web browser.

Thus, the currently disclosed system does not require proprietary infrastructure to operate, but enables a third party to build and deploy customizable applications through the use of an open architecture employing HTTP/S, HTML, XML, SOAP, and WSDL. The on-device agent of the present disclosure may be deployed on an existing infrastructure without the need for proprietary servers or other infrastructure.

FIG. 6A shows window 500 displaying currently active devices 502, IP address 504, port 506, last update 508, Media Access Control (MAC) address 510, battery 512, memory 514, and sample time 516. When an administrator refreshes window 500, the application running on the central management system makes a call to a database table holding the values of attributes 502 through 516. The tracker plug-in on the remote device provides the updates to the table which may be displayed on window 500. Typically, the tracker plug-in sends updates every ten minutes. Other time frames for updates may also be used. Any device having last update 508 older than ten minutes is thus either turned off, outside network coverage, or unable to transmit data for another reason. Further, log manager plug-in 410 of FIG. 5 provides data which updates MAC address 510, battery 512, and memory 514. Sample time 516 displays the time when the log manager plug-in last submitted an update.

FIG. 6B shows an exemplary embodiment of the type of network conditions that may be monitored remotely, in this case on a BlackBerry device. This screen provides information about the network adapter configuration of the smartphone including bytes sent/received, GSM, CDMA status, and WLAN information.

Figure 6C:
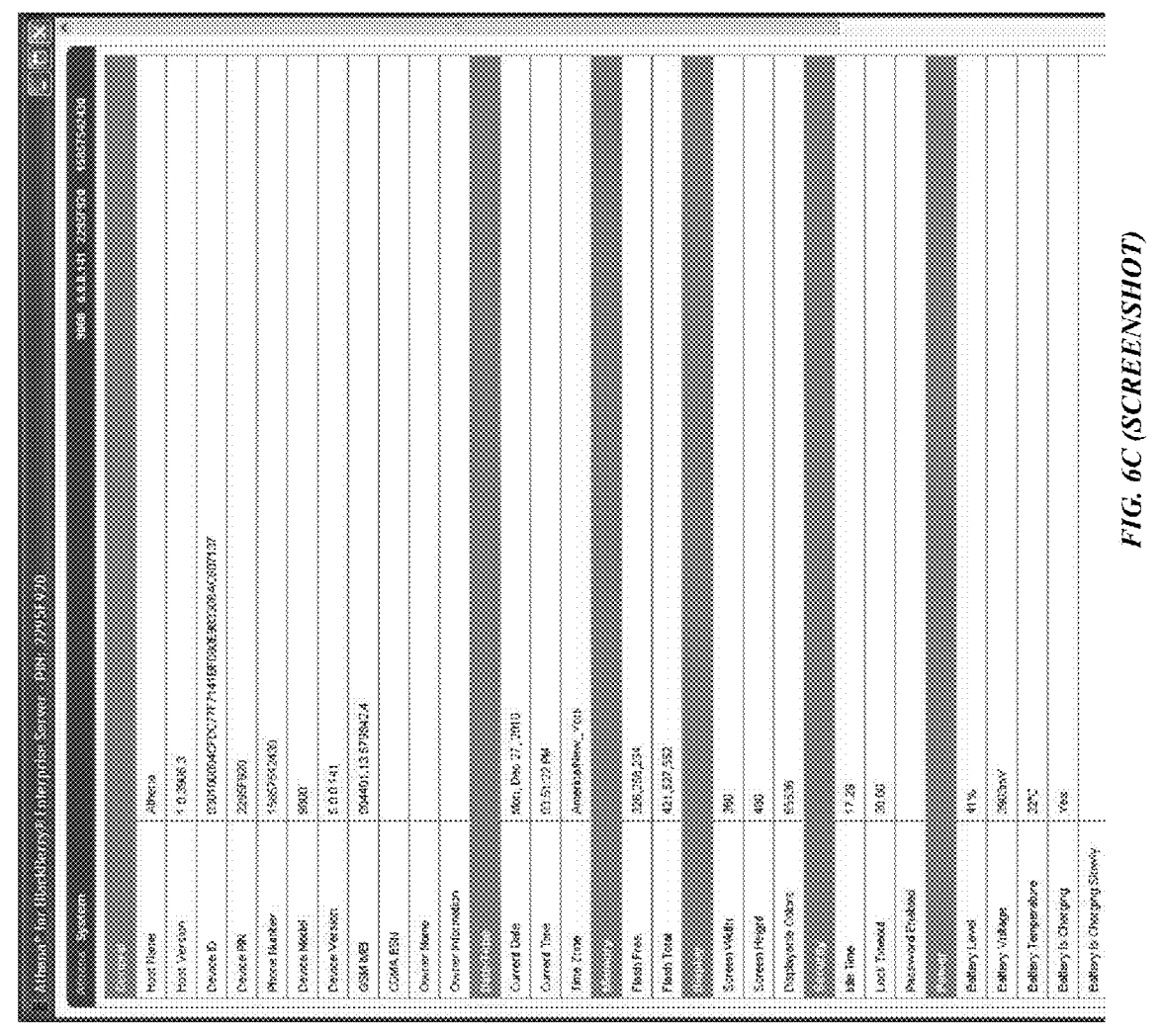

FIG. 6C shows an exemplary embodiment of general system information that may be viewed remotely. System information listed includes general information about the remote device, including headings General, Date/Time, Memory, Display, Security, Power, and Local information.

FIG. 7 shows remote control window 600 providing remote support for remote devices. Remote control window shows device window 602 as it actually appears on the remote device. An operator, IT administrator, or other support professional may remotely operate the remote device through device window 602.

Any action that can be done directly on the device can be performed during a remote control session. Multiple concurrent connections can be made to one device and all connections will display/view the same screen. Screen capture, video capture, and macro options are available to aid in troubleshooting and diagnosis of device issues.

Screen and video capture options enable the recording of screens and procedures that are accessed or run on the device during a remote control session. The macro option enables the recording of keyboard input and mouse clicks. During remote control sessions, devices with touch screens may be controlled using a desktop mouse. Smartphone devices may be controlled through desktop keyboard actions.

Further, remote control window 600 includes battery 604 and memory 606 usage. An application queries the device for these attributes which are then displayed graphically in remote control window 600. A support professional may further send a message to the remote device by typing the message in field 610 and clicking send message button 612. The message will then be displayed on the remote device.

Thus, remote control window 600 enables remote troubleshooting of a remote device through interactive support. An IT administrator or other support professional may easily troubleshoot a device by remotely interacting with the actual device. For example, device settings such as backlight settings on a cell phone could be remotely modified.

FIG. 8 shows window 700 for remotely managing applications. List 702 shows applications installed on the remote device. A support professional may remotely add or remove applications from list 702. When the support professional clicks add 704, a dialog box appears in which the support professional selects a Pocket PC setup (.cab) file (which may have been created with some installation tool) in the file system or on a remote network drive. When such a file is selected, it is copied to the device and setup is started. Similar processes apply, mutatis mutandis, to non-Pocket PC embodiments.

Device information window 800, shown in FIG. 9A, displays information about the service host 802, the device system 804 and 806, device memory 808, and batteries 810 and 812. The system manager plug-in of FIG. 3 makes this information available to window 800. Window 800 displays process information 814 about currently running processes on the device. A support professional may remotely terminate a process by right-clicking on the process name and selecting stop.

Figure 9B:
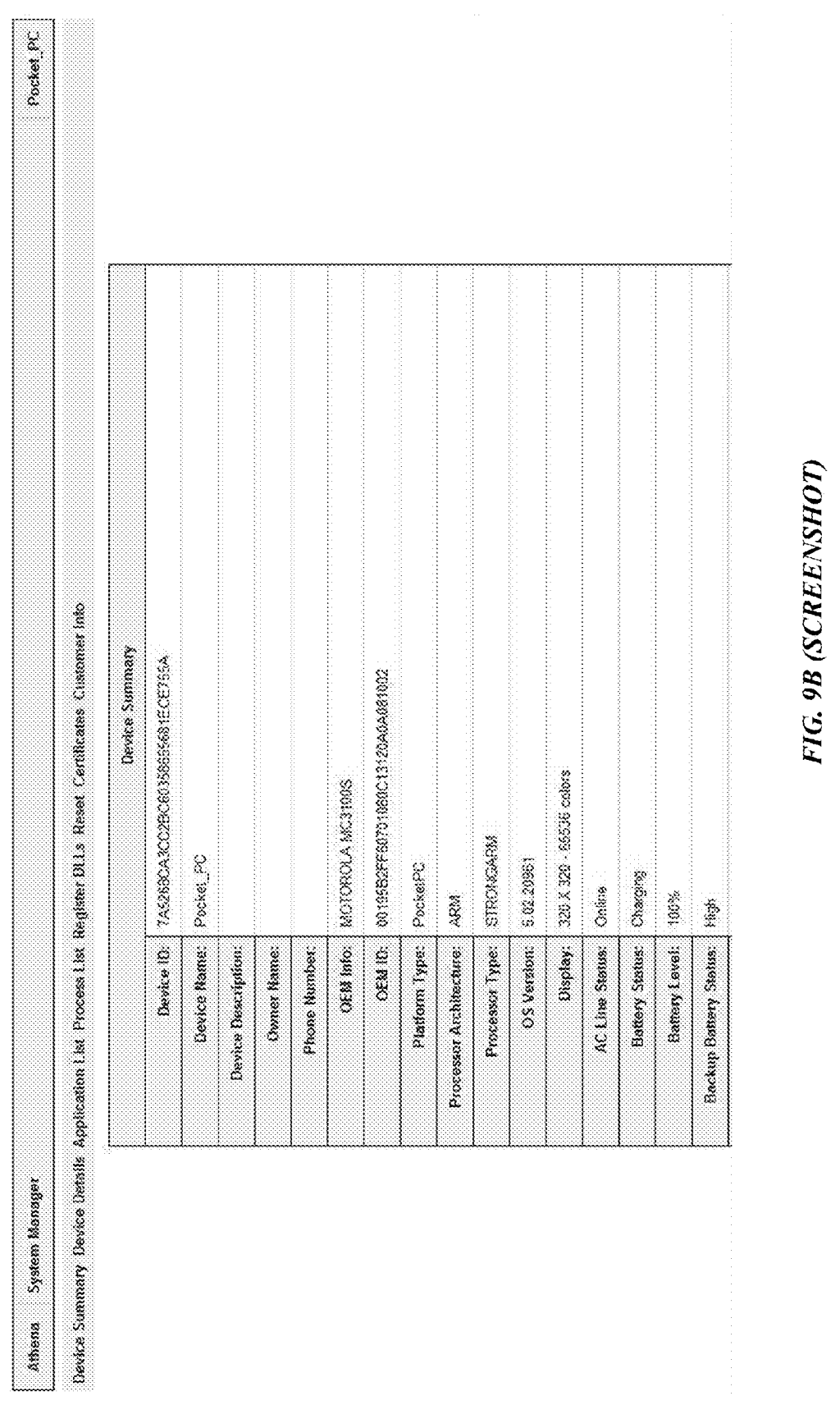

FIG. 9B shows another embodiment comprising similar types of information, a device summary window. This device summary is part of the system manager plug-in discussed above. The system manager plug-in accesses device system information to provide remote management of the device. System manager enables the viewing of current summary and detailed information about the device, such as device status and type of device.

Actions such as installing and removing applications, controlling device processes, registering and unregistering DLLs, performing device resets (which may include simply restarting the service host, a warm reset of the whole device, or a cold reset of the whole device) or viewing device certificates, can be done remotely from system manager.

Available selections for system manager may include device summary, device details, application list, process list, register DLLs, reset, certificates, and customer info.

The device summary shown in FIG. 9B provides a general summary of the device and an overview of the current device status. For example ID, battery information, operating system information, and current device time.

File manager window 900, shown in FIG. 10, shows information about the files and folders on the device. The file contents may then be remotely accessed using the file manager plug-in of FIG. 1. Further, applications may be remotely run by right-clicking an application file (.exe or the like), and then clicking START.

Now that the basic methods for accessing the plug-ins and the system of the present disclosure have been discussed, the reader is directed to a discussion of methods, systems, and computer-readable media for employing the functionality of the plug-ins. The functionality may be accessed automatically through management servers or interactively through web pages. A management system remotely executes methods of the plug-ins to remotely manage the device. Further, the methods disclosed and other plug-in methods may be used in applications developed by independent developers as discussed heretofore.

In one embodiment, the present disclosure allows device provisioning of remote devices through centralized management systems. A server, console, PC, or other management system may be used to distribute and update software and device settings. This feature allows device provisioning through either an automated or an interactive process. Typically, the automated process occurs through the management server or console and the interactive functions occur through a web page interface.

Figure 11A:
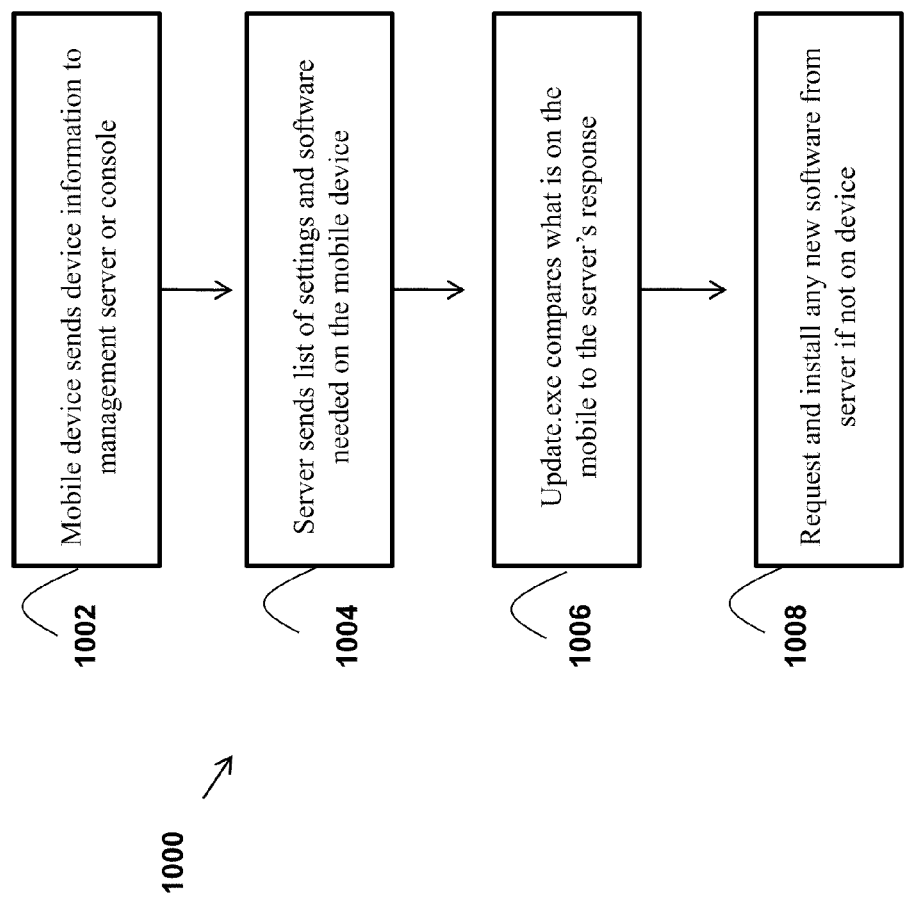

FIG. 11A shows exemplary provision flow 1000. In step 1002, an executable file (e.g. Update.exe) sends device information about the remote device to the server. In step 1004, the server sends the remote device a list of mission critical device software and settings needed on the specified device. In step 1006 the executable file checks the device settings against the mission critical list to make sure the device has the appropriate software and settings. If the device does not have the appropriate software, the remote device sends a request to the server requesting the software in step 1008. The server sends the appropriate software, which is then downloaded and set up on the device. The update program continues checking the critical settings and software until it exhausts the list. The remote device settings may be automatically changed in the course of this process.

Provision flow 1000 typically sends information through HTTP/S, although one of skill in the art will recognize that other protocols and methods may also be used.

The automatic provision and interactive provisioning features take advantage of the plug-ins discussed heretofore. For example, when updating applications, the system manager plug-in could be used to install software. Provision flow 1000 uses several methods part of the system manager plug-in discussed below. Other methods not specifically discussed could also be implemented as part of the system manager plug-in or a different plug-in. The partitioning of method and use of the methods discussed is intended to aid the reader in understanding the subject matter. The specific methods discussed below are not central to provision flow 1000. However, the open architecture of the present disclosure enables access to the methods of the plug-ins through standard internet protocols. This central feature of the present disclosure may enable an unlimited number of different methods for enabling provision flow 1000.

A GetApplicationList( ) method on the system manager plug-in returns all installed applications on the remote device. The returned array of strings represents each application name installed on the remote device using a CAB file or other automated installation technique.

An InstallFile(FileName) method installs files on the remote device. The FileName parameter specifies the full path and file name of a file residing on the remote device. FileName may specify a CAB, CPF, or XML Configuration file on the device. As mentioned earlier these are only exemplary methods used in this example, other methods could be invoked for installing other types of files.

An InstallConfigXML(XML) method installs device settings from a configuration XML fragment string. The parameter XML specifies a string of XML formatted text having device settings to be installed on the device. Configuration Service Providers (CSPs) in the operating system WAP provisioning client may use information provided in the XML document to effect changes to the device configuration.

Although the methods above have been described in connection with provisioning a remote device, the modular nature of the plug-ins allow the methods to be called when using different features disclosed herein as well. Further, because the present disclosure enables an open architecture based remote device management system, independent developers may remotely execute these methods when designing their own applications.

Further, these applications may be called internally by other plug-ins. In one embodiment, the log manager plug-in executes a GetProcessListEx( ) method on the system manager plug-in. The GetProcessListEx( ) method returns a list of running processes on the device.

Thus, provision flow 1000 employs the system manager plug-in of the present disclosure to enable unattended installation of files, applications, and other software. Further, provision flow 1000 allows unattended changes to device settings and features. The same methods disclosed could be used for an interactive web page method of installing files, applications, and other software or changing device settings.

The device provisioning feature further allows detection of corrupt software, updating applications while in use, or updating applications sharing common files or subsystems. Device provisioning may also enable changing configurations, updating security certificates, and other functionalities.

In one embodiment, an application known as AppUpdate is used for provisioning remote devices. The AppUpdate application is a device application used for provisioning devices. Device provisioning enables a device administrator to create groups of software installation tasks (packages) and then assign these packages to connected mobile devices or device collections (user-defined or standard collections). Using AppUpdate, devices are intelligently provisioned with content that is stored on a repository web server.

AppUpdate is used on mobile devices where a known set of applications reside that will require upgrades. Controlled or automated upgrades are determined by the device (software field upgrades), by certain actions taken on the device, or by a schedule. AppUpdate processing can be scheduled for multiple executions depending upon the needs of the specific implementation.

AppUpdate also provides a self-healing process by determining if an application needs to be repaired or restored (for example, when a missing or damaged DLL disables an application or process). AppUpdate can detect (using metrics) what is missing or damaged, and the appropriate package will be automatically downloaded to fix the application.

The AppUpdate application may be controlled by the manifest. The manifest is an XML document (control file) that describes the content and context of the repository that the device must replicate in the device-side storage areas. Most of the functionality in AppUpdate originates from the comprehensive set of operations specified in the manifest available for execution on the device.

A copy of the manifest may be downloaded via HTTP or FTP protocol from a repository web server whenever AppUpdate is run on the device. Server-side scripting or special server software is not required as the manifest file is obtained from the server via a HTTP/GET or FTP/GET command. HTTP/GET or FTP/GET commands are supported by all web servers regardless of whether the server is Microsoft-based (e.g. IIS), UNIX-based (e.g. Apache) or any other web server supporting HTTP 1.0 protocol or FTP protocols.

The manifest may be automatically created at run time based on the packages configured. The manifest contains all the commands that determine whether a package needs updating and the actions to take if an update is required.

The device (AppUpdate client agent) obtains the package description(s) from the manifest. Each package definition contains the steps necessary to install the package (install actions) and monitor the files residing on the device for content, version and/or file size (install metrics).

A comparison is made against defined install metrics and the files on the device. If one or more install metrics fail the comparison, the AppUpdate client agent will execute the install actions for the package.

Figure 11B:
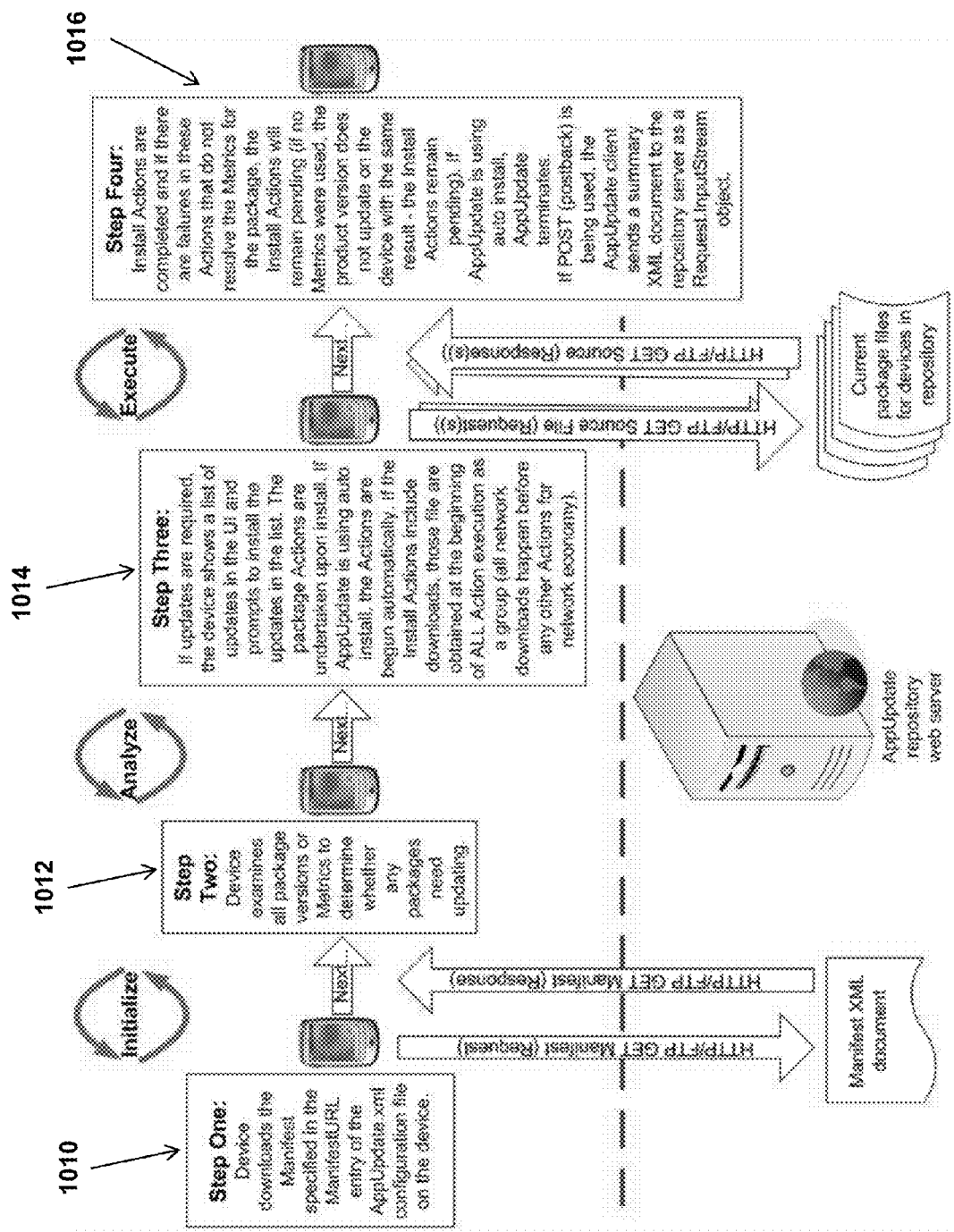

FIG. 11B shows steps that may be performed during device provisioning. At step 1010, the device downloads the manifest specified in the ManifestURL entry of the AppUpdate configuration file on the device. At step 1012, the device examines the manifest and all package versions or metrics t determine whether any packages need updating. At step 1014, if updates are required (which was determined at step 1012), the device displays a list of updates in the user interface and prompts to install the updates according to the list. The package actions are processed upon installation. If AppUpdate is set for auto install, the actions are started automatically. If the install actions include downloads, the files are obtained as a group at the start of all action execution.

Finally, at step 1016, the install actions are completed. If there are failures in the actions that do not resolve the metrics for the package, the install actions will remain pending. If no metrics were used, the package version does not update on the device and the install actions remain pending. If AppUpdate is set for auto install, AppUpdate terminates.

If POST (postback) is being used, the AppUpdate client agent sends a summary XML document to the repository web server as a Request.InputStream object.

Figure 11C:
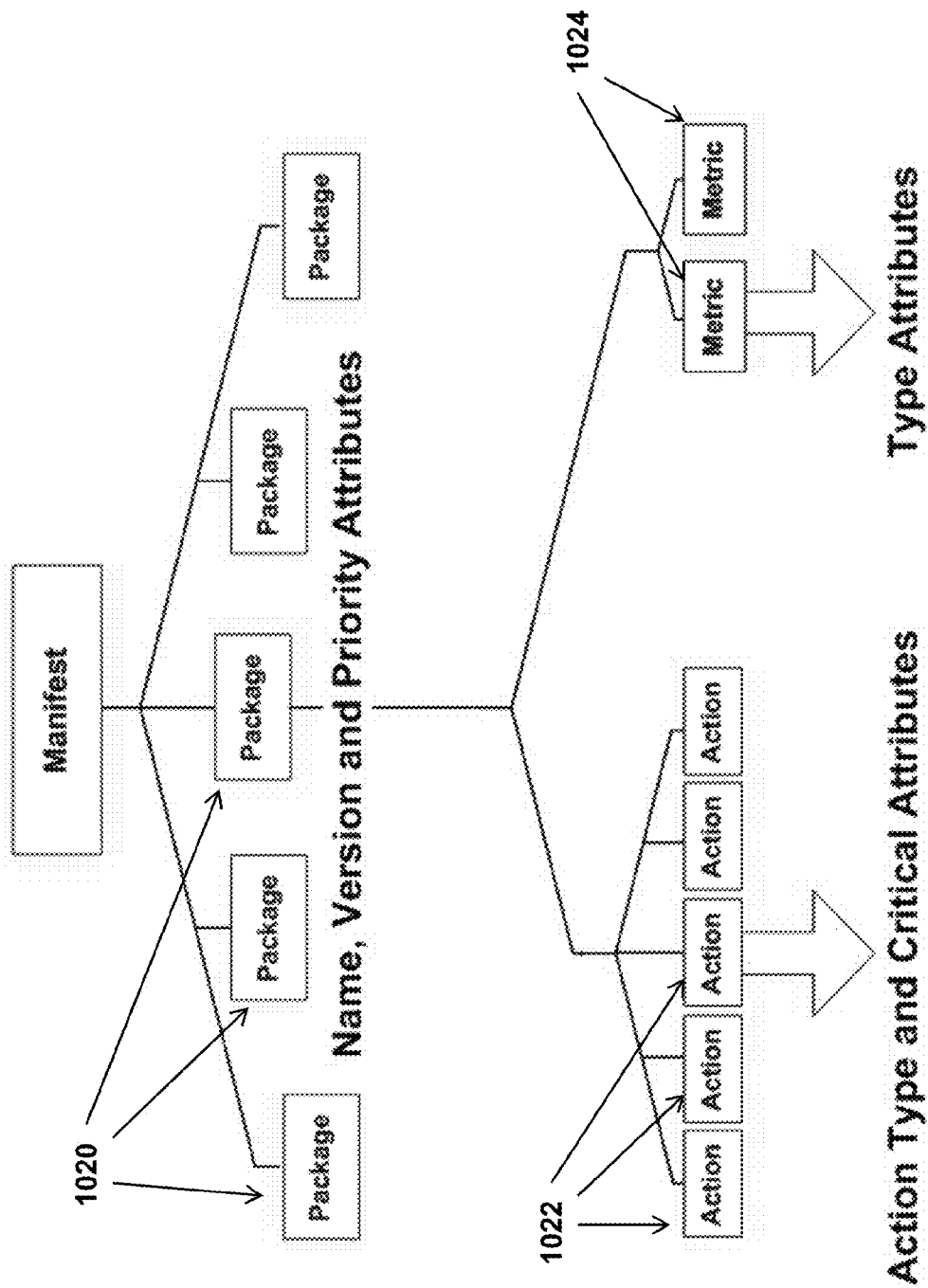

FIG. 11C provides a high level view of an exemplary manifest structure. The AppUpdate manifest is a data structure that encodes the composition of a package hierarchy. Packages 1020 consist of one or more actions 1022 and optionally one or more metrics 1024. An action defines a task for the package requirements. Each metric defines a measurement that is evaluated at the device to determine whether the package needs to be updated (refreshed). All actions for the package are performed if one or more metrics are detected as out of date on the device.

A similar structure is cached on the device to compare this data against and to determine the necessary actions to undertake if the device-side application determines that some component of the manifest needs provisioning (missing or incorrect version).

The manifest file structure may comprise the XML header, manifest, product, action, and metric XML tags.

In another embodiment, the present disclosure enables remote device reporting. In this embodiment, data on the status of the hardware and software of the device, the health status of the device, network information (including, e.g., adapter names IP routing table, connections, routes, address resolution protocol (ARP) tables, statistics, and access points), and messaging statistics may be gathered. Health status may include data such as condition of the hardware and software of the device, the available storage space, the available memory, how often the device has been restarted, information about application crashes, network errors, signal strength, device logs, etc. This information may be automatically gathered or determined via interactive methods such as web pages.

The present disclosure allows an administrator to create and modify software packages for installation on a remote device. A package consists of software installation tasks which are assigned to connected remote devices or collections of devices. Packages are managed on the central server in the site environment. In one embodiment, the administrator may proceed via a wizard to create custom packages for installation.

Figure 11D:
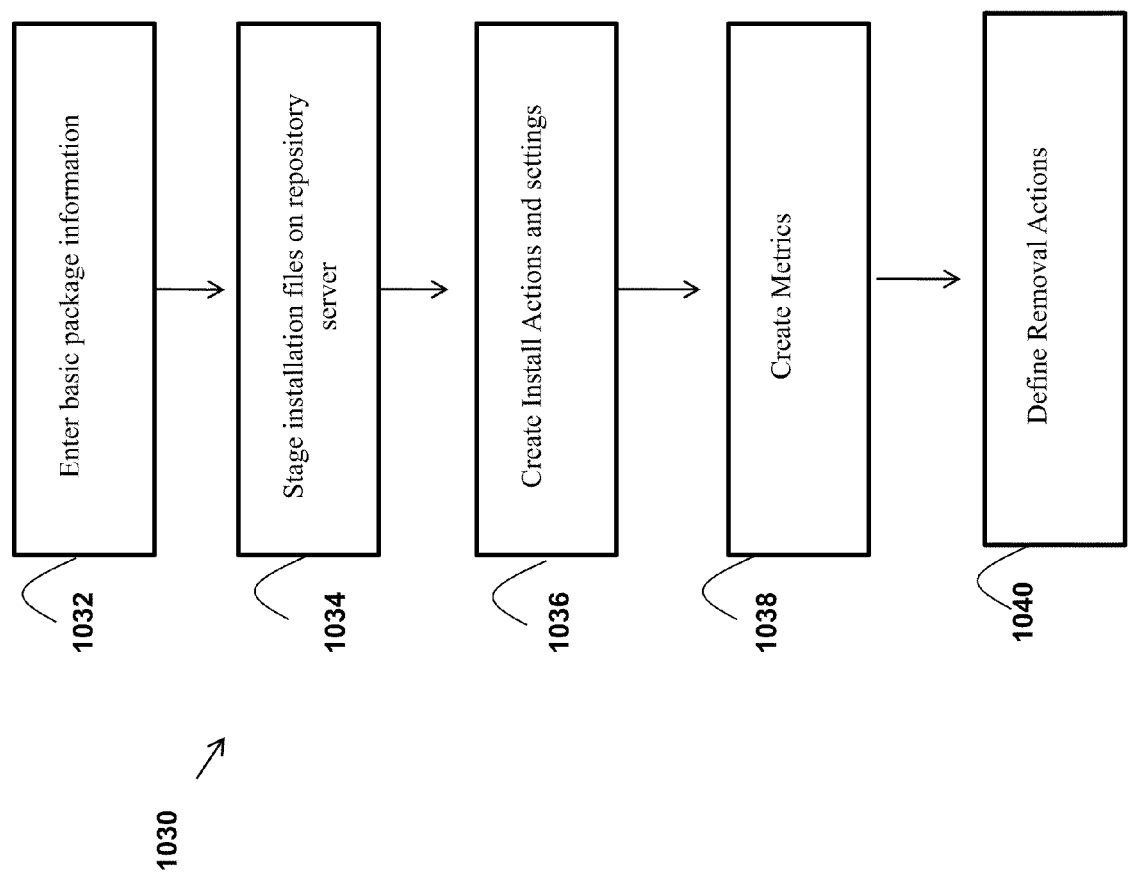

Process flow 1030 in FIG. 11D shows the basic process steps for creating a custom software package. At step 1032, the administrator enters basic package information, such as package name, short package name, the provider (the source) of the application, the abbreviated provider name, version value for the version of the package, revision value for the revision of the package, and the priority value to indicate how the package is installed. The selections for priority are:

a. Manual. Update done manually through the AppUpdate user interface on the device. Manual does not process when using AppUpdate auto install.

b. Automatic. All required and recommended packages are installed when using AppUpdate auto install.

c. Isolation. (AppUpdate Only) updates are processed together as a group before all other priorities are processed. AppUpdate on the device is cycled after the last required update is performed.

At step 1034, files are chosen and staged on the repository server, from which remote devices can download them. AppUpdate downloads files from the repository server to the device. To download a file to a device, the file must be staged in the server virtual directory so that the device can obtain the file. The download function also ensures that files which the device obtains were placed there through this process.

At step 1036, install actions are provided. Install actions include items such as download, install, uninstall, warm boot, process (run, terminate), file system (copy, move, delete files, rename file, create, remove, rename folder), and similar actions useful in provisioning the software.

At step 1036, metrics are created to allow the software to ensure proper installation. File metrics can include file hash, file version, file size information, and the like. To determine if install actions are executed successfully, package file metrics are automatically compared by AppUpdate to the file metrics of the installed files. This process enables the automatic detection and repair of a device application or configuration.

A metric works by comparing the hash, version or size of the metric for a file located on the repository server against a specified file on the device. The AppUpdate device client compares the hash, version, or size of a device file against the value the server reports. If any metric fails, the appropriate install actions are performed. If all metrics pass, no install actions are performed.

In the absence of package metrics, the version attribute of the package definition may be compared between the repository and the last version received by the device. If these values are not equal, the appropriate install actions are performed.

At step 1040, removal actions are defined. Removal actions are the instructions required to remove packages from devices. An administrator also can edit, delete, and arrange the actions. A default set of removal actions may be automatically generated from the install actions, but this may be customized as necessary. The package is then completed and ready to be provisioned to remote devices, but it may be edited at a later time if necessary.

Packages may be distributed to remote devices with a high degree of granularity. Distribution of packages to devices can occur concurrently at two levels: (1) direct assignment of packages to individual devices (device-level) and (2) assignment of packages to collections of devices (collection-level). Device-level distribution assignments override collection-level distribution assignments.

The packages assigned to a device are the sum of all packages assigned to the device and all packages assigned to collections of which the device is a member.

Figure 11E:
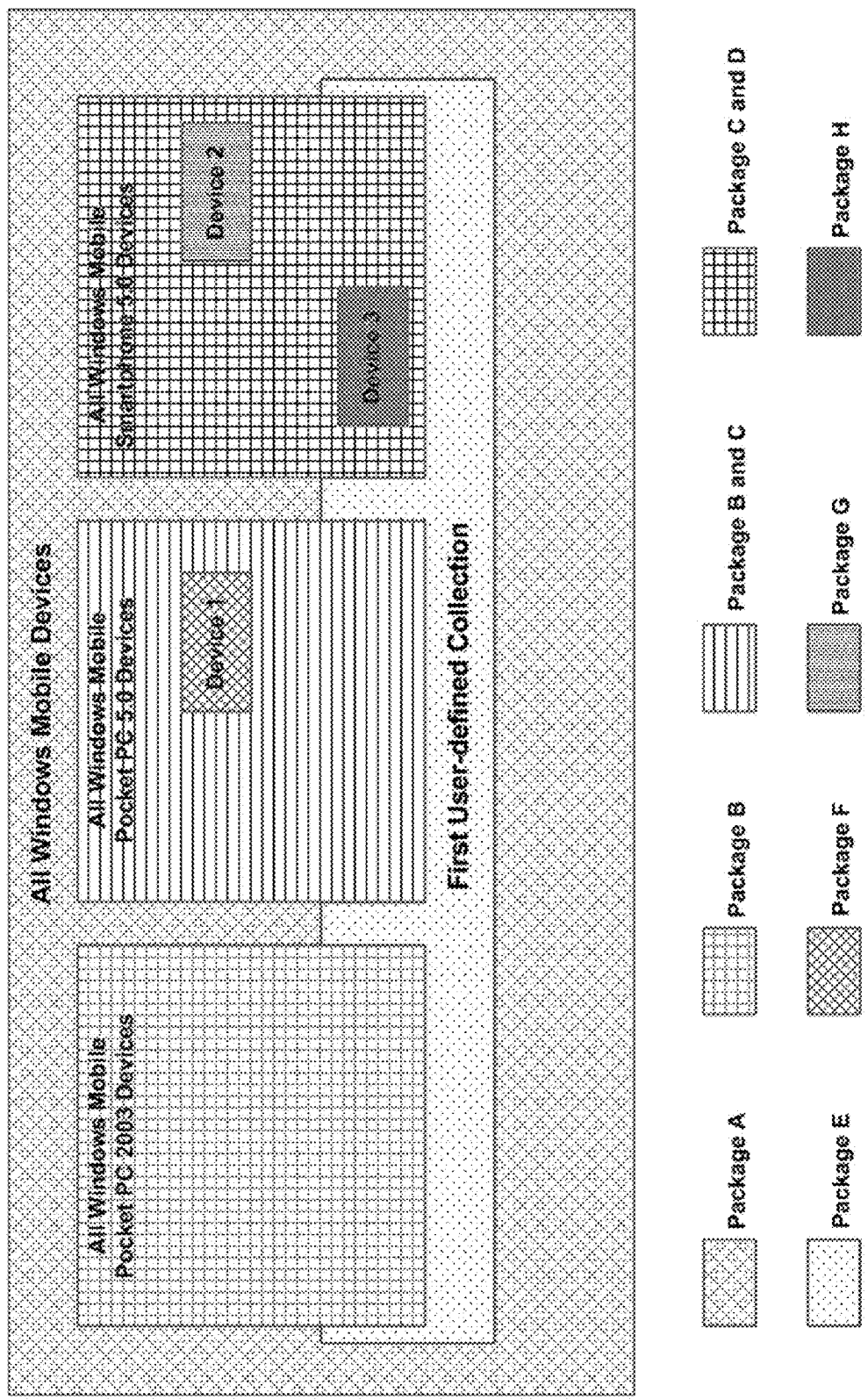

FIG. 11E shows an example of a distribution scheme for three different devices. As shown, different packages have been assigned to Device 1 and Device 2 directly and to various device collections. As a result of these assignments, the devices would receive the following packages:

Device 1: Package A, Package B, Package C, Package F.
Device 2: Package A, Package C, Package D, Package G.
Device 3: Package A, Package C, Package D, Package E, Package H.

This illustrative example shows only Windows Mobile devices, but one of ordinary skill will recognize that it may easily be generalized to provide for provisioning devices of all types.

The file manager plug-in may be implemented in different ways for different types of remote devices, but still provide a standardized API for use with the web services interface to the on-device agent. A ListFiles(Path, Sort) method from the file manager plug-in may be used to return a list of summary information about files on the remote device matching the specification. Table 3 below shows the parameters of the method call and the file information returned. The parameter Path specifies the directory on the device to interrogate for the files. The parameter Sort specifies the order of the list. The Sort parameter may be name, size, type, or date. The returned structure includes an echo of the Path and Sort parameters and the list of file names and attributes matching the specification of the Path and Sort parameters.

TABLE 3

ListFiles( ) method parameters and return values

| Column | Type | SubColumn | Type |
|---|---|---|---|
| Path | <string> | | |
| Sort | <string> | | |
| FileList | Array of <struct> FileInfo | FileInfo.Name | <string> |
| | | FileInfo.Type | <string> |
| | | FileInfo.SizeLow | <int> |
| | | FileInfo.SizeHigh | <int> |
| | | FileInfo.Date | <datetime> |
| | | FileInfo.Attributes | <string> |

A GetSystemInfo( ) method of the system manager plug-in returns summary information about the device. Table 4 below shows a subset of the device information returned. Other device information about the battery, memory, phone number, or processor could be returned. Any information residing on the device may be reported by the system manager plug-in.

TABLE 4

GetSystemInfo( ) Method partial return values

| Column | Type |
|---|---|
| OEMInfo | <string> |
| PlatformType | <string> |
| ProcessorArchitecture | <int> |
| ProcessorArchitectureString | <string> |
| ProcessorType | <int> |
| ProcessorTypeString | <string> |
| ProcessorLevel | <int> |
| ProcessorRevision | <int> |
| OsMajorVersion | <int> |
| OsMinorVersion | <int> |
| OsBuildNumber | <int> |

TABLE 4-continued

GetSystemInfo( ) Method partial return values

| Column | Type |
|---|---|
| OsVersionString | <string> |
| OsPlatformId | <int> |
| OsPlatformIdString | <string> |
| OsCsdVersion | <string> |
| AthenaMajorVersion | <int> |
| AthenaMinorVersion | <int> |
| AthenaBuildNumber | <int> |
| AthenaVersionString | <string> |
| ACLineStatus | <int> |

A messaging service plug-in (not shown in FIG. 3 or 4) enables the gathering of message statistics of the remote device. A GetAccountStatistics(Account) method returns stored statistics of a specified account. Table 5 below shows the parameters of the method call and values returned. The account may be an e-mail, SMS, or MMS account.

TABLE 5

GetAccountStatistics( ) Method

| Column | Type | SubColumn | Type |
|---|---|---|---|
| AccountStatistics | <string> | AccountName | |
| | <string> | FriendlyName | |
| | Array of <struct> StatisticsCategory | Description | <string> |
| | | MessagesIn | <int> |
| | | BytesIn | <int> |
| | | MessagesOut | <int> |
| | | BytesOut | <int> |

A GetAccessPoints( ) method may return network information including, but not limited to, network adapters on the device, active TCP connections, active UDP connections, TCP statistics, UDP statistics, IP routing table, access points on the device, and a list of all available network access points and the available signal strength. Table 6 below shows the returned values once a RPC invokes the GetAccessPoints( ) method.

TABLE 6

GetAccessPoints( ) Method

| Column | Type | SubColumn | Type |
|---|---|---|---|
| AccessPoints | Array of <struct> AccessPoint | MacAddress | <int> |
| | | SSID | <string> |
| | | WepRequired | <boolean> |
| | | RSSI | <int> |
| | | SignalStrength | <int> |
| | | NetworkType | <string> |
| | | Frequency | <double> |
| | | Channel | <int> |
| | | OperatingMode | <string> |

In another aspect, the present disclosure offers interactive support through its web page interface. An IT department or other support professional part of a help desk may operate the remote device as if actually holding it. This feature enhances troubleshooting capabilities by allowing the help desk personnel to remotely operate the device and view the device screen in real time.

Figure 12:
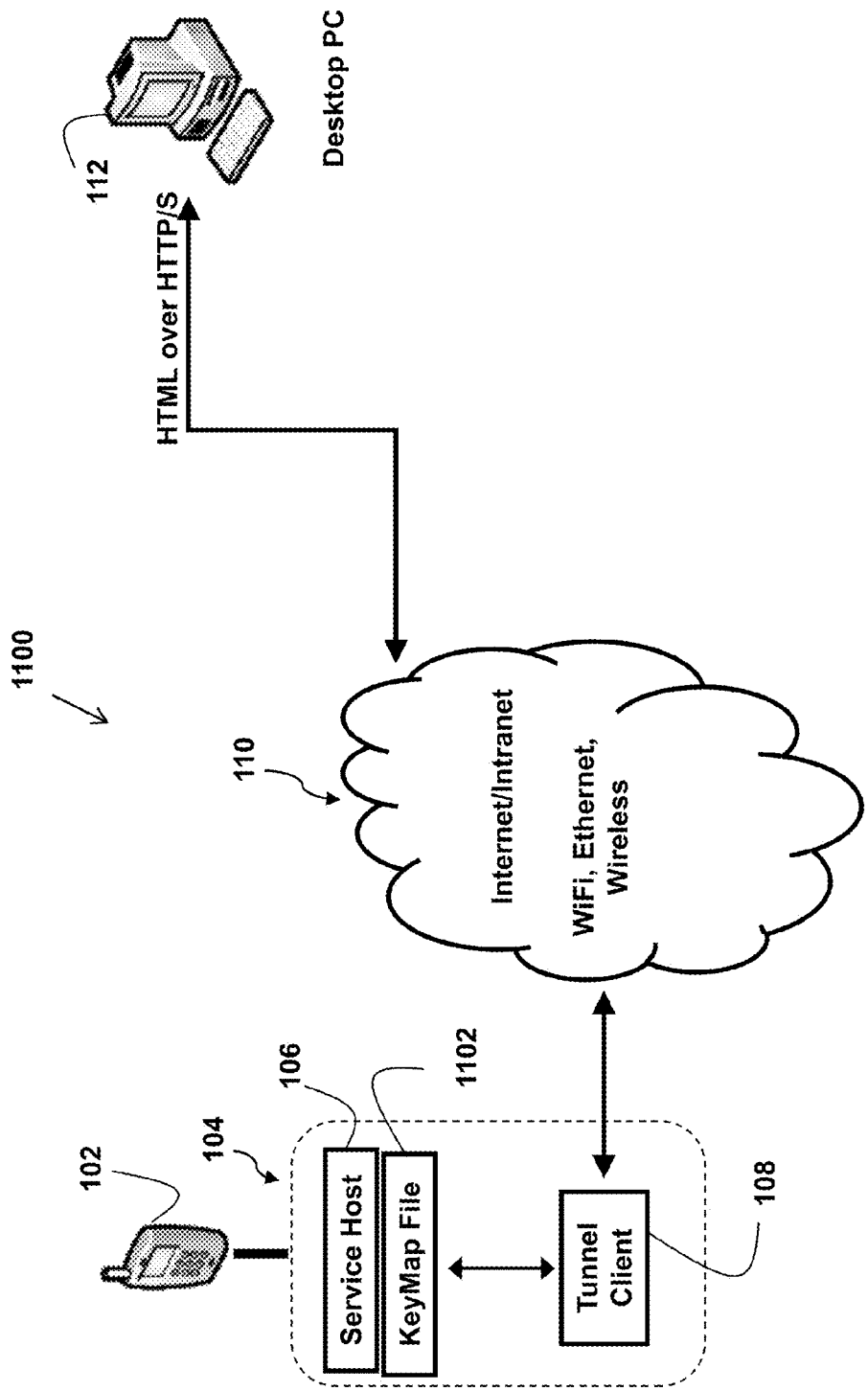
FIG. 12 shows a key mapping file implemented to enable live support.

FIG. 12 shows management architecture 1100 for enabling live support substantially similar to system management architecture 100. Management architecture 1100 further includes key mapping file 1102. When keyboard 1104 of PC 112 remotely operates remote device 102, PC 112 sends keystrokes across network 110 as a hexadecimal (hex) code to service host 106. Since each remote device 102 may have a different hexadecimal code for a keystroke, key mapping file 1102 translates hexadecimal code sent from PC 112 to the correct keystroke of remote device 102. Service host 106 may then use this input to operate remote device 102 through its plug-ins.

In some instances, one hex code of PC 112 translates to multiple keystrokes on remote device 102. For example, a hex value of 2C represents the ";" character on a keyboard. Two separate hex codes may need to be implemented on remote device 102 to represent the same ";" character. Key mapping file 1102 handles all such device-specific key mapping.

PC 112 also sends other inputs such as mouse click and mouse movement to service host 106. Plug-ins of service host 106 use these inputs to operate remote device 102.

The following methods may be used to remotely control a remote device. First, a GetActivePort( ) method returns the port that the remote control server listens to.

A CaptureScreen (Format, Quality) method returns a byte stream of the device's current display. The parameter Format specifies the format of the image file to produce. The value may be either bmp or jpeg. If JPEG is specified, the Quality parameter specifies the compression as an integer from 1 (maximum compression) to 100 (minimum compression).

FIG. 13A shows screen captures 1200 and 1202 having a compression of 100 and 10 respectively. Screen captures 1200 and 1202 may be viewed by the help desk operator at a central location. As discussed earlier, inputs to and from the help desk PC communicated through a web page are transmitted to the service host. These inputs may be used to operate the device.

In another embodiment, a macro file having input information including position of mouse movements, key strokes, and timing of inputs may be recorded when a help desk operator remotely operates a device. This macro file may then be played when helping others with their problem. In one embodiment, the macro file may be played to discover whether a problem is an isolated or common problem.

FIG. 13B shows an embodiment of the capability for an administrator to remotely control a device, in this case a controller for a BlackBerry device. The current screen of the device is shown in image 1210 and updates in real time as actions occur. Key mapping 1212 shows what keys on the keyboard correspond to actions on the remote device. And options panel 1214 allows the administrator to choose things like color depth, image scale, and image format for captured screenshots.

The controller enables remote live access and control of a BlackBerry smartphone. When the smartphone is accessed, the controller page will display the screen that is displayed currently on the smartphone. Multiple concurrent connections to one device may be established.

Screen and video capture options enable the recording of screens and procedures that are accessed or run on the smartphone during a controller session. The macro option enables the recording of keyboard input and/or mouse clicks. Smartphones with and without touch screens are supported, and one of ordinary skill will recognize that similar embodiments for other types of remote device are possible as well.

In another aspect, the present disclosure may implement tracking of phone and messaging statistics. As mentioned earlier, the messaging service plug-in allows access to messaging statistics of e-mail, SMS, and MMS accounts.

A GenerateStatistics( ) method allows messaging statistics for all accounts to be displayed. The GenerateStatistics( ) method returns the messages sent and received for each account during the last 90 days.

A phone service plug-in (not shown in FIG. 3, 4 or 5) gathers phone usage statistics. This may include phone logs, text messages, email, and the like. Certain legal considerations may arise in the context of monitoring this data. For example, if the remote device belongs to the user rather than the company, it may be the case that the company cannot lawfully monitor some or all of this information. Therefore, the nature of the data collected may be configured on a per-device basis to ensure compliance with local law.

Monitoring these usage statistics may, for example, give the company the ability to prove that an alleged email did not actually originate from the accused user. It may also provide auditability necessary under Sarbanes-Oxley or other legal requirements.

In one embodiment, the on-device agent or the log manager plug-in thereof records all the desired usage information in real-time, storing it to a secure location on the device. Then that data may be uploaded periodically to the server (optionally in an encrypted and/or compressed form). This embodiment extends battery life by not having the mobile device continually contacting the server every time a monitored usage event occurs. But since usage is monitored in real time, it also prevents the user from being able to send a message and then immediately delete it, thereby avoiding detection.

In one embodiment, the log manager service module samples and presents information about other service modules or plug-ins. The device information is collected or sampled and then transmitted from the device to a server using FTP or XML web services. Multiple sets of device information can be logged to multiple log files and transmitted to multiple servers.

The log manager configuration file is used to configure the log manager service module. The log manager may be configured to check for changes to the configuration file every 30 seconds. In the configuration file, a log file is defined as a group of one or more samples. A sample is an XML web service call to a service.

Predefined groups may automatically appear in log manager, such as SYSTEMINFO and NETWORKING status. These groups contain the device information displayed in other service modules, such as system manager and networking service modules.

Custom groups can be created using settings in the configuration file to collect and transmit specific device information.

The log manager page contains general information about the device and status information for each defined group or log file.

An upload manager plug-in may be used to move data from devices to a server. The data files are compressed and uploaded to a queue file on the device. The queue file is then transmitted to a server. The process can be done on a scheduled basis or manually using options on the upload manager page.

The upload manager service moduler can be configured to upload multiple sets of data files and transmit the queue files to multiple servers.

A queue file is defined in the configuration file as a group which consists of one or more queue items (upload data). Each group contains settings that determine how queuing and uploading are managed.

Text files which contain the web service responses that are generated when a queued upload completes may be viewed to ensure successful completion. For example, if the upload was successful or if an error was encountered during upload, this may be ascertained via the upload manager.

A GetPhoneCalls( ) method returns phone call information in the form of the structure shown in Table 7 below.

TABLE 5

GetPhoneCalls( ) return values

| Column | Type | SubColumn | Type |
|--------|------|-----------|------|
| Phone Calls | Array of <struct> PhoneCall | Number | <string> |
| | | Name | <string> |
| | | StartTime | <DateTime> |
| | | EndTime | <DateTime> |
| | | Duration | <int> |
| | | DurationString | <string> |
| | | Type | <string> |
| | | CallerID | <string> |
| | | Connected | <boolean> |
| | | Dropped | <boolean> |
| | | Roaming | <boolean> |

Other methods enabled on the phone service plug in gather services enabled on the device, operators on the device, account of messages sent and received, voicemail information, and message statistics information. Further, phone information on the device may be gathered.

Figure 14:
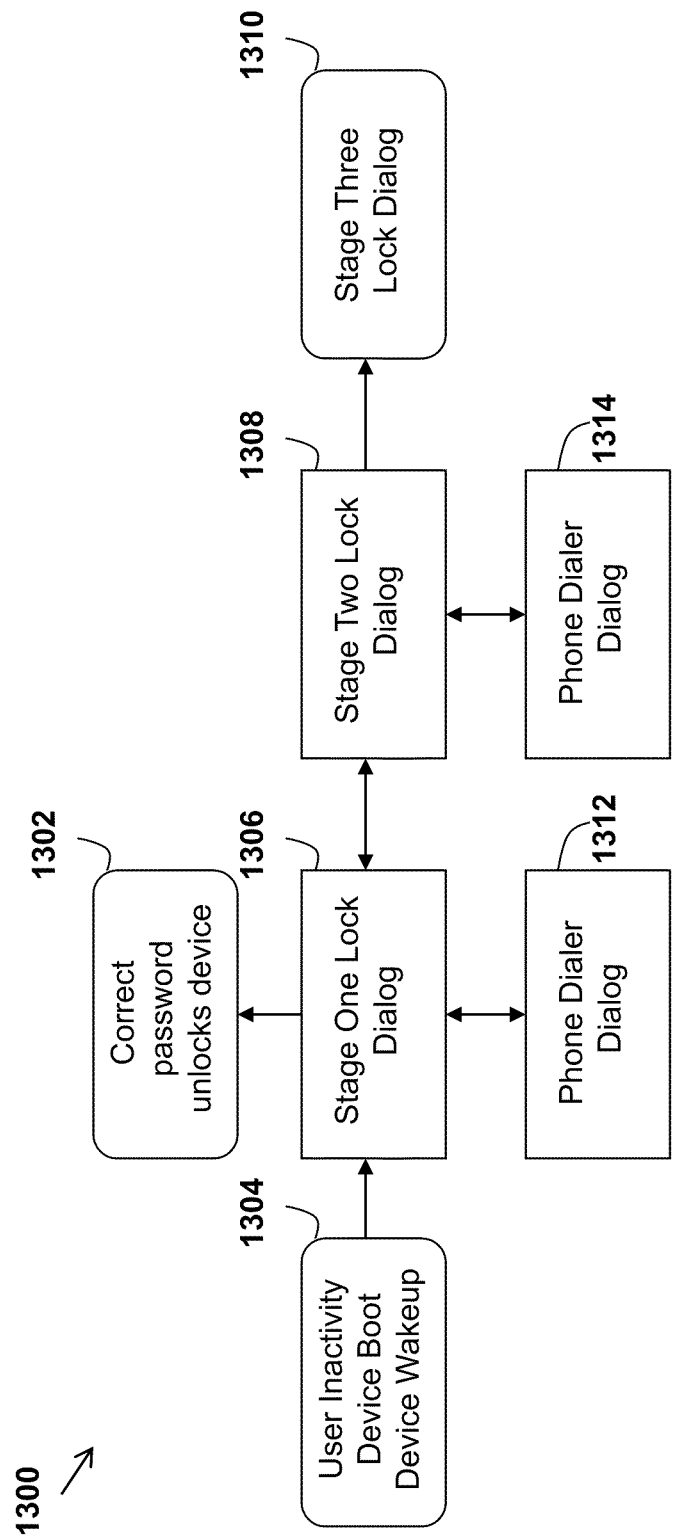
FIG. 14 is a flow chart depicting a multi-stage security functionality implemented on the service host.

FIG. 14 is a flow chart depicting a multi-stage security functionality implemented on the service host. The security features guard the remote device from unwanted use by locking the device according to a multi-layered security process. FIG. 14 displays the process flow for the multi-stage security locking module 1300 which provides enhance remote device security through a password lock. First, the security process is initiated, 1304, by a user wishing to engage the remote device. The security process may engage when the device is started, booted, or after a period of user inactivity. Stage one lock dialog 1306 then prompts the user to enter the password in order to unlock the remote device. A correct password entry 1302 will unlock the device. An incorrect password entry prompts phone dialer dialog 1312 which may prompt the user to re-enter the password again with a dialog such as "Password incorrect. 1 attempt remaining." If the user then enters the correct password, the device is unlocked. If the user enters the incorrect password (or enters an incorrect password a set number of times), the device moves to stage two lock dialog 1308 which prompts the user to enter the stage two password—a different password than the stage one lock dialog 1306 password. It may be required that the user call or contact support and provide verification information to obtain the stage two password. Stage two lock dialog 1308 may prompt the user to enter the stage two password with dialog such as "IMPORTANT—Call support and give them this number (123456) to receive the stage two password." An incorrect stage two password entry prompts phone dialer dialog 1314 which may prompt the user to re-enter the password again with dialog such as "Password Incorrect. 5 attempts remaining." If the user then enters the correct password, the device is unlocked. If the user again enters the incorrect password (or enters an incorrect password a set amount of times), the device moves to stage three lock dialog 1310, which locks the device permanently. After the device is permanently locked, only an administrator may then unlock the device. For safety reasons, the device may be configured to allow access to emergency phone numbers even while in some or all stages of locking.

Figure 15:
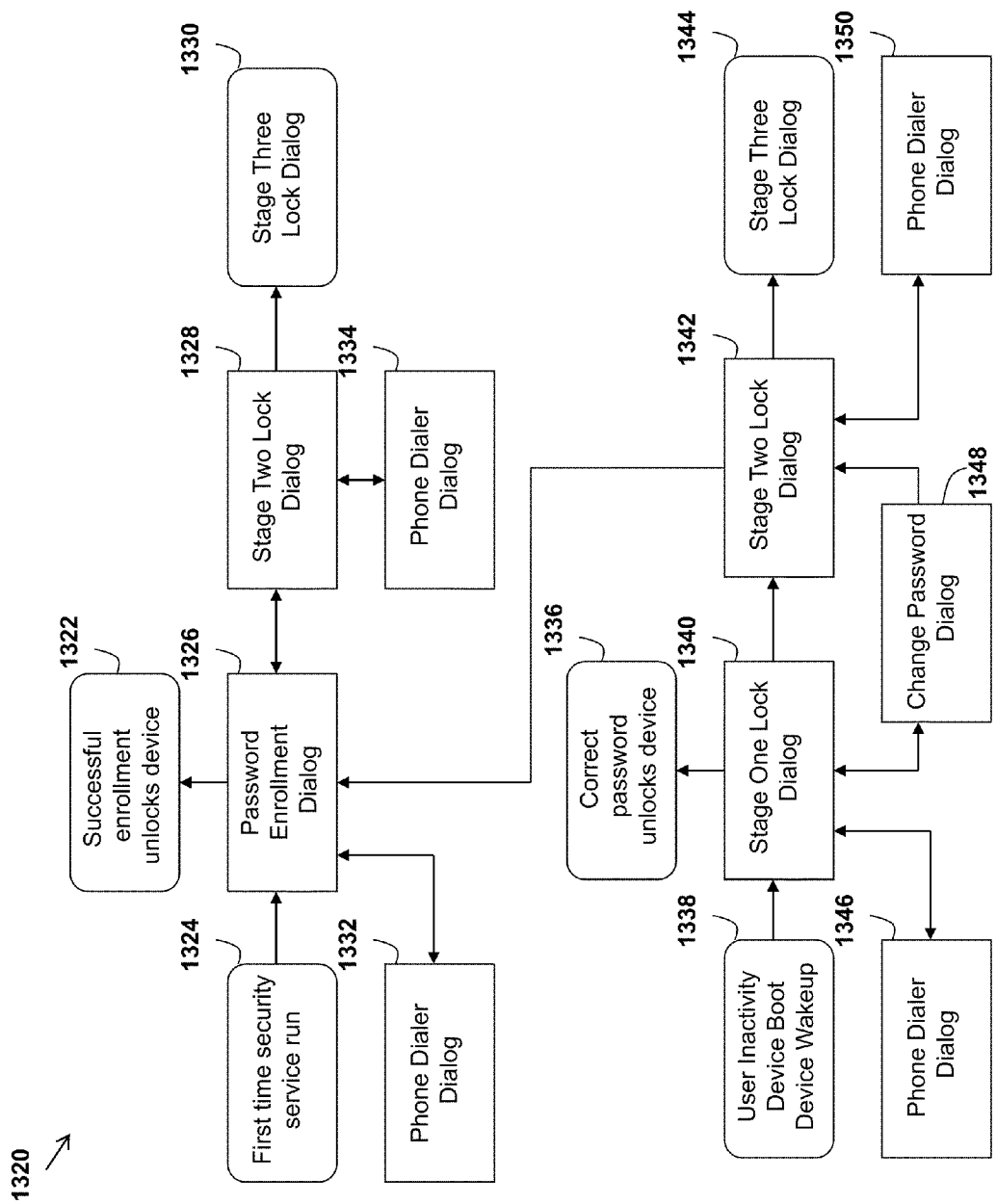
FIG. 15 is a flow chart depicting a multi-stage security functionality implemented on the service host with password enrollment.

FIG. 15 is a flow chart depicting a multi-stage security functionality implemented on the service host. The security features guard the remote device from unwanted use by locking the device according to a multi-layered security process similar to the security process shown in FIG. 14 but with an added layer of security: password enrollment dialog 1326. FIG. 15 displays the process flow for the multi-stage security locking module 1324 with password enrollment feature turned on which provides enhance remote device security through a password lock. Password enrollment dialog 1326 allows the user to set an initial security password for the device and may be initiated by first time security service run 1324 or stage two lock dialog 1342. First time security service run 1324 will initiate password enrollment dialog 1326. Password enrollment dialog 1326 prompts the user to enter a new password and prompts the user to enter a pre-set default password as a security confirmation prior to entering the initial password. The user must have access to the default password to set an initial password—the default password is in most cases set by administrative support. Password enrollment dialog 1326 may prompt the user to enter a password of a specific type (i.e. containing a minimum number of characters) and may require that the user enter the new password twice for confirmation. After the user enters the initial password, password enrollment is completed and the device is unlocked, 1322. If the user fails to properly enter an initial password, the device moves to stage two lock dialog 1328. Here, phone dialer dialog 1334 prompts the user to call a support number to retrieve the stage two password to unlock the device. If unsuccessful, the device moves to stage three lock dialog 1330 and the device is permanently locked (i.e. must be unlocked by an administrator).

Password enrollment dialog 1326 may also be initiated by the user from stage two lock dialog 1342. In this instance the security process is initiated, 1338, by a user wishing to engage the remote device. The security process may engage when the device is started, booted, or after a period of user inactivity. Stage one lock dialog 1340 then prompts the user to enter the password in order to unlock the remote device. A correct password entry 1336 will unlock the device. An incorrect password entry prompts phone dialer dialog 1346 which may prompt the user to re-enter the password again. If the user then enters the correct password, the device is unlocked. If the user then again enters the incorrect password (or enters an incorrect password a set amount of times) the device moves to stage two lock dialog 1342 which prompts the user to enter the stage two password—a different password than the stage one lock dialog 1340 password. From stage one lock dialog 1340, the user may access change password dialog 1348.

Change password dialog 1348 prompts the user to enter a new password and prompts the user to enter the current password as a confirmation prior to entering the initial password. Change password dialog 1348 may prompt the user to enter a password of a specific type (i.e. containing a minimum number of characters) and may require that the user enter the new password twice for confirmation. After the user enters the new password, the password has been changed and the device moves to stage one lock dialog 1340. If the user fails to properly enter an initial password, the device moves to stage two lock dialog 1342.

From stage two lock dialog 1342 the user may access password enrollment dialog 1326 if an initial password has not yet been set. Successfully completing password enrollment dialog 1326 will unlock the device. However, if an initial password has been set, stage two lock dialog 1342 may prompt the user to enter the stage two password with dialog such as "IMPORTANT—Call support and give them this number (123456) to receive the stage two password." An incorrect stage two password entry prompts phone dialer dialog 1350 which may prompt the user to re-enter the password again with dialog such as "Password Incorrect. 5 attempts remaining." If the user then enters the correct password, the device is unlocked. If the user then again enters the incorrect password (or enters an incorrect password a set amount of times), the device moves to stage three lock dialog 1344, which locks the device permanently. After the device is permanently locked, only an administrator may then unlock the device.

In addition to permanent locking, a stage three lock may also optionally initiate a memory wiping process on the device to protect confidential information.

The subject matter of the present disclosure has so far largely been described as being implemented via an on-device agent. However, an agentless embodiment is also possible. One way of implementing an agentless embodiment is via Exchange ActiveSync or a similar protocol; the agentless embodiment is sometimes known as Exchange ActiveSync Management Services (EAS).

EAS enables the management of mobile devices that support Microsoft Exchange within Microsoft System Center Configuration Manager or another management console. Microsoft Exchange ActiveSync is a protocol which enables the synchronization of mobile devices with Exchange mailboxes.

Management of mobile devices may include viewing devices and device information; viewing, defining, and assigning policies; controlling device wipe actions for security; removing device partnerships; and other management tasks. Management of Windows Mobile and non-Windows-Mobile devices is supported with EAS. For example, iPhone and Android devices can be viewed in the configuration manager console and policies can be managed. The policy settings that are supported depend on the device manufacturer. FIG. 16 provides a screenshot of an embodiment of management console 1400 showing EAS-connected devices 1410.

A partnership is established when a device connects or syncs to the Exchange server. When a partnership is removed, the partnership and all associated policy information for the device is removed from the Exchange server. Communication with the device is no longer available.

Remove partnership is an option used in conjunction with wiping a device. A wipe should be performed on the device before remove partnership is done to completely remove the partnership from Exchange by resetting the device. Otherwise, when the device attempts to reconnect, a message will appear on the device prompting to re-establish the partnership.

Microsoft Exchange policies are used for managing and assigning settings to different users and groups. Policies are assigned to user mailboxes and provide associated devices with a standard set of device security, synchronization, hardware, application access, and file access settings.

Although the disclosed subject matter has been described in detail, it should be understood that various changes, substitutions and alterations may be made hereto without departing from the spirit and scope of the invention as defined by the appended claims.

What is claimed is:

1. A non-transitory computer readable medium having instructions thereon, the instructions being executable by a processor to:
   determine, by a remote device, that an Internet Protocol (IP) address of the remote device is unreachable;

initiate, by an on-device agent encoded on the remote device, a connection from the remote device to a support computer upon determining that the IP address of the remote device is unreachable, the on-device agent comprising a tunnel client and a service host, the service host comprising an application plug-in and a web server, wherein the application plug-in comprises an extensible markup language based (XML-based) client to provide a first mode of accessing the plug-in, a hypertext markup language (HTML) interface to provide a second mode of accessing the plug-in, and an XML-based remote procedure call (RPC) interface to process a request to use the plug-in;

establish, by the on-device agent via the tunnel client, a secure tunnel to the support computer via the connection;

provide, by the on-device agent, a screen view interface of the remote device to the support computer; and receive, from the support computer via the on-device agent, a plurality of control signals, the plurality of control signals corresponding to remote device actions occurring in essentially real time.

2. The non-transitory computer readable medium of claim 1, wherein the instructions are executable by the processor to:
provide file system information to the support computer; and
accept file system changes from the support computer.

3. The non-transitory computer readable medium of claim 1, wherein the instructions are executable by the processor to:
provide a mouse-based interface to the support computer, the mouse-based interface corresponding to a touchscreen-based interface on the remote device.

4. The non-transitory computer readable medium of claim 1, wherein the instructions are executable by the processor to:
provide a keyboard-mapping-based interface to the support computer, the keyboard-mapping-based interface corresponding to a physical button-based interface on the remote device.

5. The non-transitory computer readable medium of claim 1, wherein the instructions are executable by the processor to:
determine whether the connection from the remote device to the support computer is lost; and
upon determining that the connection is lost, the instructions are executable by the processor to re-establish, by the remote device, the connection and the secure tunnel.

6. The non-transitory computer readable medium of claim 5, wherein the instructions to re-establish the connection are executable by the processor to:
re-establish the connection based at least in part on a re-try cycle.

7. A computer-implemented method for supporting a remote device, comprising:
determining, by a processor of the remote device, that an Internet Protocol (IP) address of the remote device is unreachable;
upon determining that the IP address of the remote device is unreachable, initiating, by an on-device agent encoded on the remote device, a connection from the remote device to a support computer, the on-device agent comprising a tunnel client and a service host, the service host comprising an application plug-in and a web server, wherein the application plug-in comprises an extensible markup language based (XML-based) client to provide a first mode of accessing the plug-in, a hypertext markup language (HTML) interface to provide a second mode of accessing the plug-in, and an XML-based remote procedure call (RPC) interface to process a request to use the plug-in;

establishing, by the on-device agent via the tunnel client, a secure tunnel to the support computer via the connection;

providing, by the on-device agent, a screen view interface of the remote device to the support computer; and receiving, from the support computer via the on-device agent, a plurality of control signals, the plurality of control signals corresponding to remote device actions occurring in essentially real time.

8. The method of claim 7, further comprising:
providing file system information to the support computer; and
accepting file system changes from the support computer.

9. The method of claim 7, further comprising:
providing a mouse-based interface to the support computer, the mouse-based interface corresponding to a touchscreen-based interface on the remote device.

10. The method of claim 7, further comprising
providing a keyboard-mapping-based interface to the support computer, the keyboard-mapping-based interface corresponding to a physical button-based interface on the remote device.

11. The method of claim 7, further comprising:
determining whether the connection from the remote device to the support computer is lost; and
upon determining that the connection is lost, re-establishing, by the remote device, the connection and the secure tunnel.

12. The method of claim 11, wherein re-establishing the connection comprises re-establishing the connection based at least in part on a re-try cycle.

13. A remote device, comprising:
a processor;
memory in electronic communication with the processor; and
instructions stored in the memory, the instructions being executable by the processor to:
determine, by the remote device, that an Internet Protocol (IP) address of the remote device is unreachable;
initiate, by an on-device agent encoded on the remote device, a connection from the remote device to a support computer upon determining that the IP address of the remote device is unreachable, the on-device agent comprising a tunnel client and a service host, the service host comprising an application plug-in and a web server, wherein the application plug-in comprises an extensible markup language based (XML-based) client to provide a first mode of accessing the plug-in, a hypertext markup language (HTML) interface to provide a second mode of accessing the plug-in, and an XML-based remote procedure call (RPC) interface to process a request to use the plug-in;

establish, by the on-device agent via the tunnel client, a secure tunnel to the support computer via the connection;

provide, by the on-device agent, a screen view interface of the remote device to the support computer; and receive, from the support computer via the on-device agent, a plurality of control signals, the plurality of control signals corresponding to remote device actions occurring in essentially real time.

14. The remote device of claim 13, wherein the instructions are executable by the processor to:

provide file system information to the support computer; and accept file system changes from the support computer.

15. The remote device of claim 13, wherein the instructions are executable by the processor to:

provide a mouse-based interface to the support computer, the mouse-based interface corresponding to a touch-screen-based interface on the remote device.

16. The remote device of claim 13, wherein the instructions are executable by the processor to:

provide a keyboard-mapping-based interface to the support computer, the keyboard-mapping-based interface corresponding to a physical button-based interface on the remote device.

17. The remote device of claim 13, wherein the instructions are executable by the processor to:

determine whether the connection from the remote device to the support computer is lost; and upon determining that the connection is lost, re-establish, by the remote device, the connection and the secure tunnel.

18. The remote device of claim 17, wherein the instructions to re-establish the connection are executable by the processor to re-establish the connection based at least in part on a re-try cycle.

* * * * *